(12) United States Patent
Benedict

(10) Patent No.: US 12,315,383 B1
(45) Date of Patent: May 27, 2025

(54) SYSTEM FOR TEACHING GRAMMATICAL STRUCTURE OF SENTENCES

(71) Applicants: Daniel Scott Benedict, The Woodlands, TX (US); David Alan Benedict, Centennial, CO (US)

(72) Inventor: Morgan D. Benedict, Loveland, CO (US)

(*) Notice: Subject to any disclaimer, the term of this patent is extended or adjusted under 35 U.S.C. 154(b) by 0 days.

(21) Appl. No.: 18/586,815

(22) Filed: Feb. 26, 2024

(51) Int. Cl.
*G09B 17/00* (2006.01)
*G09B 5/06* (2006.01)
*G09B 21/00* (2006.01)

(52) U.S. Cl.
CPC .......... *G09B 17/006* (2013.01); *G09B 5/06* (2013.01); *G09B 21/003* (2013.01)

(58) Field of Classification Search
CPC ...... G09B 17/006; G09B 5/06; G09B 21/003; A63H 33/086
USPC .......................................................... 434/178
See application file for complete search history.

(56) References Cited

U.S. PATENT DOCUMENTS

| | | |
|---|---|---|
| 1,446,868 A | 2/1923 | Baker |
| 1,542,031 A | 6/1925 | Bruhn |
| 2,482,402 A | 9/1949 | Corcodilos |
| 2,966,832 A | 1/1961 | Vergobbi |
| 3,208,162 A | 9/1965 | Wisdom |
| 3,307,274 A | 3/1967 | Glaser |
| 3,564,735 A | 2/1971 | Fisher |
| 3,670,427 A | 6/1972 | Stolpen |
| 3,728,800 A | 4/1973 | Magram |
| 3,822,499 A | 7/1974 | De Vos |
| 3,873,096 A | 3/1975 | Shoptaugh |
| 4,047,322 A | 9/1977 | Keisling |
| 4,170,425 A | 10/1979 | Brown |
| 4,258,479 A | 3/1981 | Roane |
| 4,326,354 A | 4/1982 | Hagberg |
| 4,443,199 A | 4/1984 | Sakai |
| 4,478,582 A | 10/1984 | Tucker |
| 4,522,404 A | 6/1985 | Di Gregorio |
| 4,613,309 A | 9/1986 | McCloskey |
| 4,643,683 A | 2/1987 | Orsini et al. |
| 4,650,424 A | 3/1987 | Mitchell |

(Continued)

OTHER PUBLICATIONS

"Shapes that Shape Minds," thelinigroup.com, https://web.archive.org/web/20221126081654/https://www.thelinigroup.com/Magical-shapes/, Nov. 26, 2022 (Year: 2022).*

(Continued)

*Primary Examiner* — Peter S Vasat
*Assistant Examiner* — Stephen Alvesteffer
(74) *Attorney, Agent, or Firm* — Patricia C. Brzostowicz; Superior Patent Group, LLC

(57) ABSTRACT

The present application comprises a system for learning relationship based information, such as parts of a sentence or parts of speech, in one exemplary embodiment, comprising at least a set of three-dimensional hollow one-piece blocks that may be physically and/or electronically connected to each other as well as additional parts of the system such as memory, processors, transmitters, receivers, and imaging devices. Cues such as tactile, visual, or auditory cues may be added to the hollow blocks. The system may further comprise interactive and/or non-interactive learning supports such as an adjustable clamp, wand, glove, integrative form, worktable, and electronic workstation.

36 Claims, 21 Drawing Sheets

(56) References Cited

U.S. PATENT DOCUMENTS

| | | | | |
|---|---|---|---|---|
| 4,758,195 | A | | 7/1988 | Walsh |
| 5,013,245 | A | * | 5/1991 | Benedict .................. G09B 1/10 |
| | | | | 434/211 |
| 2006/0215476 | A1 | * | 9/2006 | Owen ...................... G09B 1/34 |
| | | | | 365/230.03 |
| 2011/0201272 | A1 | * | 8/2011 | De Weerd ............ G09B 19/025 |
| | | | | 455/39 |
| 2013/0302763 | A1 | * | 11/2013 | Edwards .................. G09B 1/36 |
| | | | | 434/362 |
| 2016/0008731 | A1 | * | 1/2016 | Thompson ............ A63H 33/086 |
| | | | | 347/213 |
| 2017/0308743 | A1 | * | 10/2017 | Csaszar ................... G06F 3/014 |
| 2021/0001240 | A1 | * | 1/2021 | Mikkelsen .......... B29C 45/0001 |
| 2021/0233421 | A1 | * | 7/2021 | Lee ...................... A63H 33/042 |

OTHER PUBLICATIONS

UNC Mirror online publication, Jan. 22, 2014, Entrepreneurial Challenge Holds Preliminary Round.
U.S. Pat. No. 185,889, B1, Boorman, Jan. 2, 1877.

\* cited by examiner

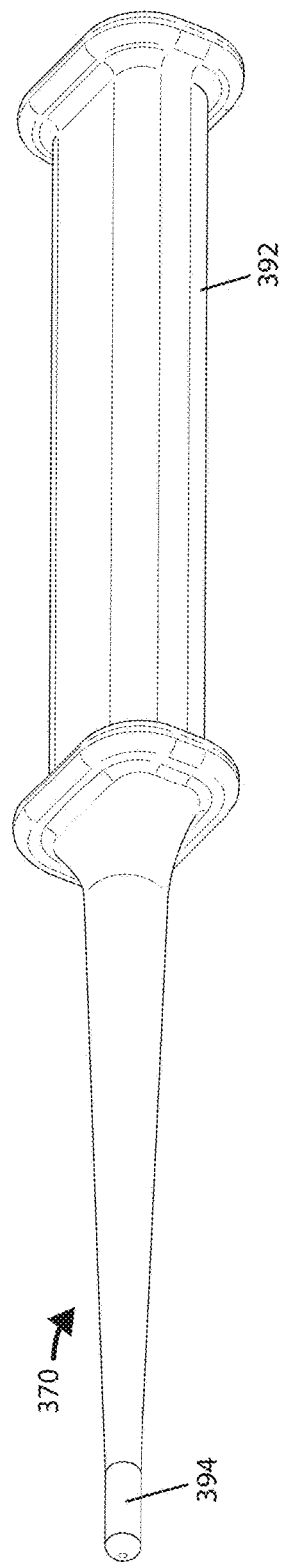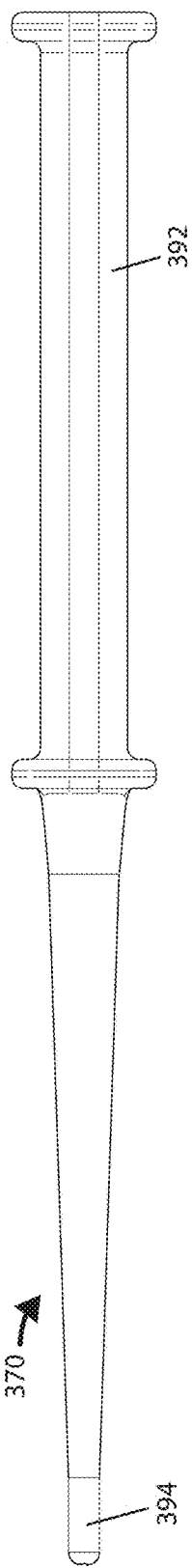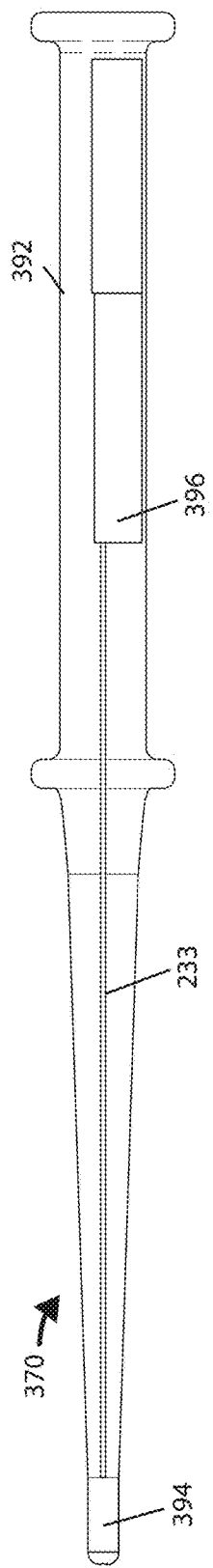

SYSTEM FOR TEACHING GRAMMATICAL STRUCTURE OF SENTENCES

FIELD OF DISCLOSURE

This disclosure relates to a system and method for teaching relationships of objects, terms, and other interrelated concepts in the grammatical structure of sentences.

BACKGROUND

The learning style theory proposes that different students learn most effectively when information is presented to them in a certain way. One such model of learning is the VARK model that explains different ways students learn. Students may be visual learners, assimilating information depicted graphically well, auditory learners, assimilating information they hear well, reading and writing learners, assimilating two-dimensional written content well, and kinesthetic learners, assimilating information presented in tactile three-dimensional physical form well.

For kinesthetic learners it can be challenging to create devices that effectively teach basic grammatical concepts such as sentence structure when sentences, by nature, are written. A prior art device, disclosed in U.S. Pat. No. 5,013,245, titled Information Shapes attempted to bridge this gap for kinesthetic learners using interlocking solid geometric shapes, differing in shape and color based on each part of speech a shape represented. Still, not all learners, especially those with sight and/or hearing challenges, may be able to assimilate and learn parts of speech based on this prior art system.

BRIEF DESCRIPTION OF THE DISCLOSURE

The present application comprises a system and method for learning relationship based information, such as parts of a sentence, comprising at least a set of three-dimensional single-piece, hollow blocks with connecting members that can be physically and/or electronically connected to each other as well as other parts of the system such as memory, processors, transmitters, and imaging devices. The system may further comprise interactive and/or non-interactive learning supports such as an adjustable clamp, wand, glove, interactive form, worktable, and electronic workstation.

In another aspect, the present application is drawn to a system and method for aiding in learning relationships of objects, terms, and other interrelated concepts in one example, grammatical parts of a sentence. The system comprises a set of hollow blocks wherein the hollow blocks are of different shapes and/or sizes each representing a different part of a sentence. The hollow blocks may comprise one or more connectors and slots to connect to other blocks in the set. The hollow blocks may further comprise cues to aid in recognition such as visual, tactile, or sound cues. The hollow blocks may further comprise means to obtain data as to location and/or connection to other blocks and to transmit this data to a processing system. The system may further comprise aids such as an adjustable frame to hold the blocks, as well as an electronic wand, glove, or tabletop to further aid in the learning process. These electronic aids also capture and/or share information about the blocks. The system may further comprise a processor and memory, whether cloud-based or on location, to aggregate and to share data of the parts of the system with other parts of the system or other data displays which may be connected or wireless displays such as personal devices.

The present disclosure comprises a system for teaching relationship of interrelated concepts, terms, or parts of a given subject, the system comprising:
  at least one one-piece, hollow, three-dimensional block of a first shape and first size;
  at least one one-piece, hollow, three-dimensional block of a first shape and a second size;
  at least one one-piece, hollow, three-dimensional block of a second shape and first size;
  wherein each one-piece, hollow, three-dimensional block may be temporarily connected to one another;
  wherein each one-piece, hollow, three-dimensional block represents one of the concepts, terms, or parts of the given subject; and
  wherein additional concepts, terms, or parts of the given subject are represented by hollow, three-dimensional blocks of a third, fourth, or fifth, etc. shape and a third, fourth, or fifth, etc. size.

In another aspect, the present disclosure comprises a system for teaching grammatical parts of a sentence, the system comprising:
  at least one one-piece, hollow block of a first shape and a first size comprising at least one slot and at least one connector;
  at least one one-piece, hollow block of a first shape and a second size comprising at least one slot and at least one connector, wherein the second size is at least one-fifth smaller than the first size in each plane;
  at least one one-piece, hollow block of the first shape and a third size comprising at least five slots and at least one connector, wherein the third size is at least one-third smaller than the first size in the z plane;
  a second one-piece, hollow block of the first shape and the third size comprising at least one slot and at least one connector;
  at least one one-piece, hollow block of the first shape having a fourth size comprising one slot and one connector on opposing faces, wherein the fourth size is at least one-third smaller in the y plane than the first size;
  at least one one-piece, hollow block of a second shape having at least one slot and one connector;
  at least one one-piece, hollow block of a third shape and the first size having at least one slot and at least one connector;
  at least one one-piece, hollow block of the third shape and the first size comprising one slot and one connector on opposing faces and a unique marker;
  at least one one-piece, hollow block of the third shape comprising one slot and one connector, wherein the size is at least one-third smaller in the z plane than the block of (g);
  at least one one-piece, hollow block of the third shape having the same size as the block of (i) comprising five slots and at least one connector;
  at least one one-piece, hollow block of the third shape having a size one-quarter longer in the x plane and at least one-half smaller in the y plane compared with the size of (g) comprising one slot and one connector on opposing faces and a unique marker;
  at least one one-piece, hollow block of the third shape having a size in the x plane equaling that of (g) and a size in the y plane that is at least one-third smaller than that of (g), having one slot and one connector on opposing faces, wherein the hollow block further comprises a unique marker;

at least two one-piece, hollow blocks of the third shape each having a diameter the same as recited in (l) and length at least half that of (l) and comprising one slot and one connector on opposing faces of each hollow block;

at least one one-piece, hollow block of the third shape having a size equal to that of (l), comprising one slot and one connector on opposing faces;

at least one one-piece, hollow block of the third shape having a size in the x plane and the y plane that is at least one-fifth that of (g), and wherein the size of the block in the x plane equals the size of the block in the y plane, comprising one connector and one slot on opposing faces;

at least one one-piece, hollow block of the third shape, wherein the block comprises one slot and one connector on opposing faces and protruding members wherein the connector and/or slot are positioned; and wherein the connectors of each one-piece, hollow block are designed to fit within the slots of any other one-piece, hollow block to temporarily connect the blocks.

In another aspect, the block of (b) consists of one connector and one slot on opposing faces.

In another aspect the block of (o) consists of one connector and one slot on opposing faces.

In another aspect, the first shape, second shape, and third shape differ and are selected from a cube, cuboid, triangular prism, and a cylinder.

In another aspect, the first shape, second shape, and third shape differ and are selected from a cube, cuboid, triangular prism, cylinder, sphere, triangular cone, regular octahedron, sphere, triangular-based pyramid, and square-based pyramid.

In another aspect, the connector protrudes from the one-piece, hollow block.

In another aspect, the connector further comprises a magnet.

In another aspect, the connector comprises a flat end and wherein edges between the flat end and protruding sides of the connector do not form a right angle.

In another aspect, the edges between the flat end and the protruding sides comprises a convex shape.

In another aspect, the edges between the flat end and the protruding sides comprise an angled shape.

In another aspect, the edges between the flat end and the protruding sides comprises a beveled edge.

In another aspect, at least one of the one-piece, hollow blocks further comprises a visual cue.

In another aspect, the visual cue is chosen from a number, letter, word, light, and an image.

In another aspect, at least one of the one-piece, hollow blocks further comprises a tactile cue.

In another aspect, the tactile cue is Braille.

In another aspect, at least one of the one-piece, hollow blocks further comprises a means to produce an auditory cue.

In another aspect, each of the first shape, second shape, and third shape are a unique color.

In another aspect, two of the shapes are the same color and the third shape is a different color.

In another aspect, the one-piece, hollow blocks further comprise a power source and electronic transmitter that can transmit a location and unique identifier pertaining to the hollow block to a processor.

In another aspect, the system further comprises an imaging system for visualizing location of the blocks.

In another aspect, the one-piece, hollow blocks further comprise a receiver.

In another aspect, the system further comprises an auditory system for producing a sound.

In another aspect, the system further comprises a prompting device that transmits and receives information about location of the blocks.

In another aspect, the prompting device is a pointing device.

In another aspect, the prompting device is a wand.

In another aspect, the system further comprises a glove capable of receiving information about identity of a block and producing a response to the block.

In another aspect, the one-piece, hollow blocks are an electronic image in a software program that can be displayed on a screen of an electronic workstation, wherein the hollow blocks may be manipulated and paired by a first user, and wherein the software may provide feedback information to the first user pertaining to accuracy of pairing of blocks.

In another aspect, the system further comprises remote access means to the software wherein an additional user may view the work of the first user either in real time or by retrieval from memory of the software.

In another aspect, the first user may retrieve and view past pairings of hollow bocks.

In another aspect, the system further comprises an adjustable frame to hold one or more hollow blocks.

In another aspect, the adjustable frame comprises a transmitter and power means to transmit a location and designation for each block on the frame to a processor.

In another aspect, the system further comprises a worktable capable of pairing with at least one hollow block.

In another aspect, the one-piece, hollow blocks further comprise a power source and electronic transmitter to transmit location to the worktable.

In another aspect, the worktable comprises a power source, receiver, and processor.

In another aspect, the system further comprises an imaging system with image display on a surface of the worktable.

In another aspect, the worktable further comprises a sound system that produces sound information as to location of the hollow blocks.

In another aspect, the system further comprises an integrative form, wherein the integrative form can temporarily connect at least one of the hollow blocks.

In another aspect, the integrative form is capable of recognizing at least one hollow block and producing an auditory or visual cue pertaining to the hollow block.

In another aspect, the one-piece, hollow blocks are formed from a child-safe plastic.

In another aspect, the child-safe plastic is selected from polyethylene, poly vinyl chloride, polypropylene, and acrylonitrile butadiene styrene.

In another aspect, the edges of the one-piece, hollow blocks are beveled, angled, or convex edges.

BRIEF DESCRIPTION OF THE DRAWINGS

FIGS. 22-24 are illustrations of a wand of the present disclosure.

Figure 1:
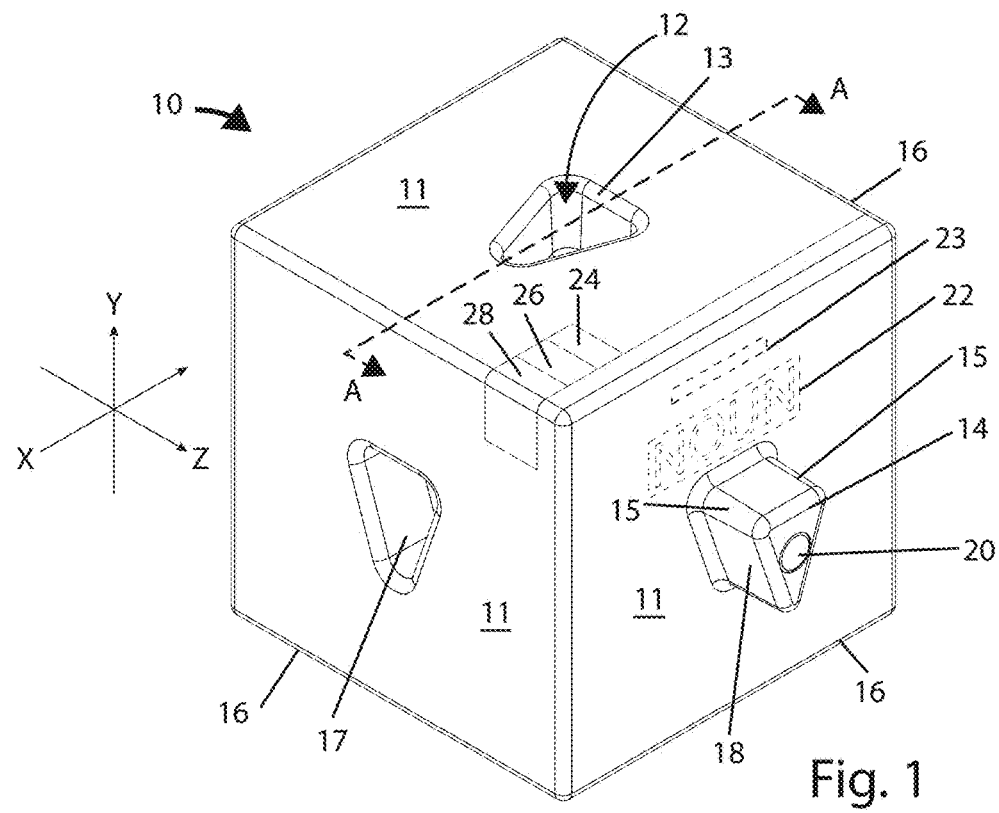
FIG. 1 is a perspective view of a first example hollow block of the present disclosure, representing, for example, a noun.

Before explaining the disclosed embodiments of the present disclosure in detail, it is to be understood that the disclosure is not limited in its application to the details of the particular arrangement shown, since the disclosure is capable of other embodiments. Also, the terminology used herein is for the purpose of description and not of limitation.

DETAILED DESCRIPTION OF THE DISCLOSURE

The present application is drawn to a system and method for aiding in learning relationships of objects, terms, and concepts in one example being grammatical parts of a sentence. The system comprises a set of one-piece, hollow blocks wherein the hollow blocks are of different shapes and/or sizes each representing a different part of a sentence. The one-piece, hollow blocks comprise one or more integrated connectors and slots to connect to other blocks in the set. The hollow blocks may further comprise cues to aid in recognition such as visual, tactile, or sound cues. The hollow blocks may further comprise means to obtain data as to location and/or connection to other blocks and to transmit this data to a processing system. The system may further comprise aids such as an adjustable frame to hold the blocks, as well as an electronic wand, glove, or tabletop to further aid in the learning process. These electronic aids also capture and/or share information about the blocks. The system may further comprise a processor and memory, whether cloud-based or on location, to aggregate and share data of the parts of the system with other parts of the system or other data displays which may be connected or wireless displays such as personal devices.

Terms

As used herein, the term "block" describes a three-dimensional object that may be any size or shape.

As used herein, the term "hollow" means that an object has open space contained inside the object. Hollow may mean partially hollow, substantially hollow, or completely hollow.

As used herein, the term "one-piece" means that the object is permanently of one form having been manufactured as a single piece. For example, a connector is an integral part, or member, of the hollow blocks of the present disclosure being part of the design of the blocks.

As used herein, the term "partially" means only in part, for example a block may be partially hollow in that part of the space may be open or unoccupied and that part may be filled with components that provide additional usefulness to the block such as a transmitter, processor, and/or other electronic components to power the transmitter and processor.

As used herein, the term "substantially" means to a great or significant extent, substantially hollow, for example, may mean, for instance 100% hollow, or 99% hollow, or 98% hollow, or 97% hollow, or 96% hollow, or 95% hollow, or 90% hollow.

As used herein, the term "completely" means totally, as in completely hollow, for example, means 100% hollow, being devoid of components.

As used herein, the term "connector" means a protruding component or part that provides means for one form, for example a block, to connect to another form or block. Alternate terms may include peg, post, protruding member, or the like.

As used herein, the term "slot" means an opening within a form that provides means, being a space to receive, for instance a connector of another form, or block, to make a semi-permanent or temporary connection to another block.

Alternate terms may include opening, hole, indention, indentation, notch, or the like.

As used herein, the term "regular shape" means a shape where all the sides are equal lengths, and all the inside angles are equal.

As used herein, the term "irregular shape" means a shape which has sides and angles of different lengths and sizes such that not all sides are of equal length and the interior angles are not all the same size.

As used herein, an x direction, extends horizontally, or pertaining to length of an object, y direction, perpendicular to x, lying vertically, or pertaining to height of an object, or z direction, being perpendicular to both x and y planes, which may be depicted as depth or width of an object.

A used herein, a "face" of an object is an exterior side or wall of the object.

As used herein, a "visual cue" is any cue or designation which may be seen or viewed visually.

As used herein, a "tactile cue" is any cue or designation that may be felt.

As used herein, an "auditory cue" is any cue or designation which may be heard.

DESCRIPTION OF THE DISCLOSURE

The system comprises a set of three-dimensional (3D), one-piece, at least partially hollow blocks having different shapes and sizes, wherein each block, in a first example, represents a part of a sentence selected from, but not limited to, a noun, pronoun, adjective, adjective preposition, adverbial preposition or subordinate conjunction, alternate preposition or conjunction, interjection, coordinate conjunction, verb, being intransitive or transitive, verbal, linking verb, article, adjective, adverb, adverbial conjunction, an auxiliary verb, or a correlative conjunction. Each block or block pair represents a word, or two words in one example, but the system may be amended such that each block may represent more than one word, a phrase, or a clause. The system may be used for the English language and learning these parts of speech and/or grammar of that language or for other languages including modern and archaic languages not limited to Spanish, Italian, French, and Canaanite. Various arrangements of the blocks and system components may be used for learning other concepts such as teaching sentence style, legal issues, coding or cryptography, or any concept with different, interrelated parts.

FIG. 1 illustrates a first example one-piece, hollow block 10, the noun block, which is three-dimensional in form having the shape of a cube. The noun block 10 comprises six sides or faces 11 which may comprise either a slot 12, or a connector 14, or include no slot or connector. The noun block 10 comprises at least one slot 12, or at least two slots, or at least three slots (not shown), or at least four slots (not shown), or at least five slots (not shown), and at least one connector 14 for pairing to other blocks. In an example the noun block 10 comprises one connector 14 and five slots 12. Slots 12 are shaped to receive a connector 14, such as a connector 14 from another block. The shapes of the slots 12 and/or connectors 14 may be triangular as shown in FIG. 1, but also may be other shapes as depicted in FIGS. 30-35 such as square 17X, 18X, rectangular, round 17Y, 18Y, oval, diamond 17Z, 18Z, pentagonal, octahedral, or any other regular or irregular shape desired. As shown in FIG. 1, the shape of the slot 12 is triangular with rounded, angled, or beveled corners 13 and is designed to receive the connector 14 also comprising angled, beveled, or rounded corners 15.

Figure 2:
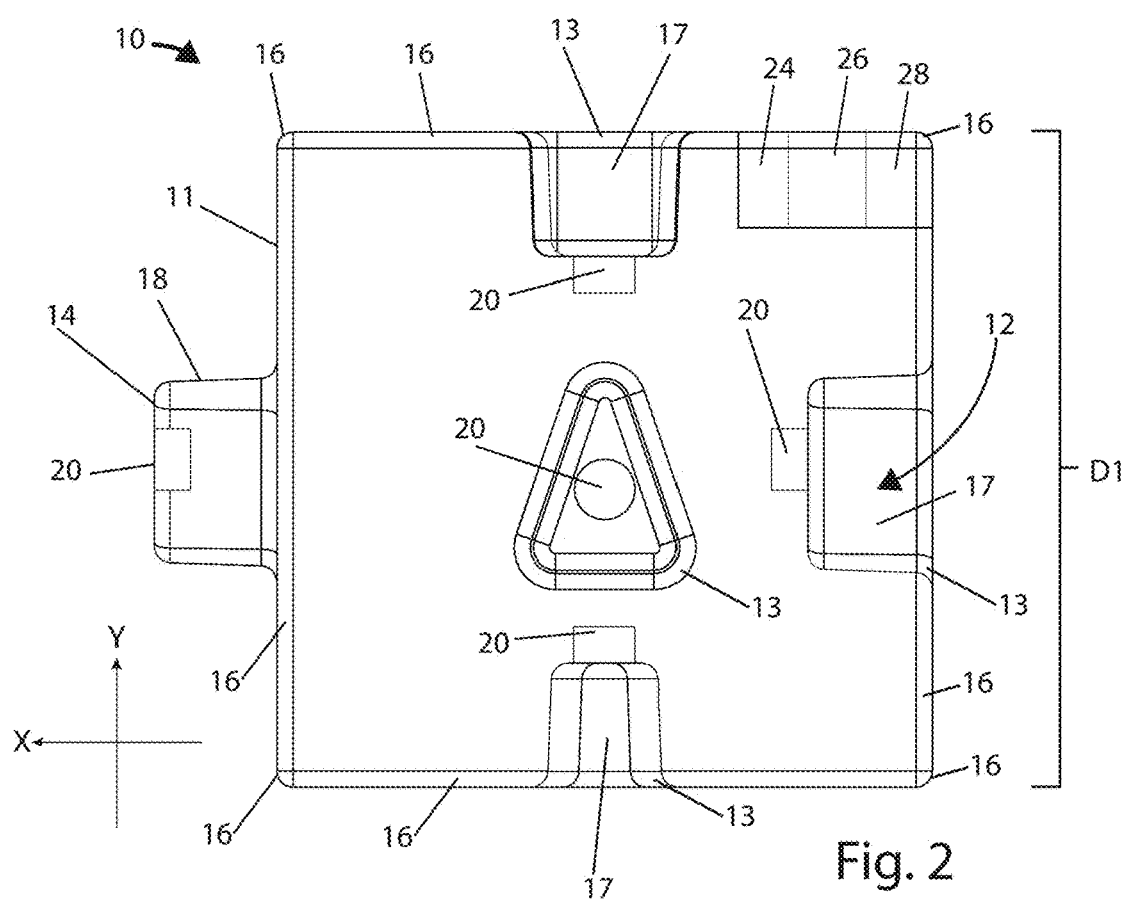
FIG. 2 is a cross-sectional view of the first example hollow block of the present disclosure, representing, for example, a noun.

FIG. 2 illustrates a cross-section view of block 10 and should be seen as an example cross-section model of all blocks of the system and is taken at A of FIG. 1. Each face 11 of the noun block 10 has a size or dimension termed D1, that ranges from at least one-half inch, or at least one inch, or at least two inches, or at least two and a half inches, or at least three inches, or at least three and a half inches, or at least four inches, or at least five inches, or at least six inches or more. In one example D1 is two inches. Dimensions of the presently disclosed blocks should be interpreted as relative and may be interchangeable to enhance learning and are presented as examples of the concept that a certain shape and size may represent a certain part of a sentence, term, concept, or object in a system. In the present example D1 is represented as greater than D2, D2 greater than D3, D3 greater than D4, and D4 greater than D5. The dimension D6 is greater than D1, D2, D3, D4, and D5, and D7 greater than D3 but less than D2. Certain dimensions may be favored to increase usability such as being sized to be manipulatable by children's hands. In one example, dimensions are as follows in Table 1.

TABLE 1

Example Dimensions of Blocks

| Dimension Label | Length |
|---|---|
| D1 | 2 inches (5.08 cm) |
| D2 | 1.5 inches (3.81 cm) |
| D3 | 1 inch (2.54 cm) |
| D4 | 0.75 inches (1.905 cm) |
| D5 | 0.5 inches (1.27 cm) |
| D6 | 2.5 inches (6.35 cm) |
| D7 | 1.25 inches (3.175 cm |

Blocks of the system may be made from materials safe for human, especially child, use. The material should be inflexible to maintain overall shape as well as slot and connector shapes for pairing. Plastic materials, such as thermoplastics, may be employed. One example plastic may be polypropylene (PP), plastic number five, which is heat resistant, acid resistant and used to make plastic bottles, caps, food containers, medical tools, automotive parts and is also safe for toys. The material should be inert, so it does not react with skin and does not leach materials from the plastic. Other alternatives may be silicone, and BPA-free, phthalate-free plastics. Block materials may be a thermoplastic such as polyamide or nylon, being a group of synthetic and natural polymers made of repeating amide groups connected by amide links. Any dyes and colorants would also be safe for child use. Method of manufacture may be, in non-limiting examples, any method appropriate to the material used such as 3D printing, extrusion blow molding, injection molding, general purpose extrusion, additive manufacturing, and/or expanded polypropylene molding.

Referring to FIGS. 1-2, the noun block 10 comprises slots 12, which also may be termed a hole, indention, or other term denoting a crevice or opening in a surface, and which serve to receive connectors 14 from other blocks described herein to form temporary attachments thereto that are triangular in shape. The edges of the slots 13, of this noun block 10, and all blocks, are not squared, i.e. do not form ninety-degree angles, but are beveled, angled, or rounded to enhance ease of attachment or detachment of connectors of another block. The depth of the sides of the slots, or slot walls, 17 would necessarily match the depth of the sides of the connectors, or connector walls, 18. These depths of these slot walls 17 and connector walls 18 would be proportional to the size of the block, for example for block 10, these walls 17, 18 could be at least 0.1, or at least 0.2, or at least 0.3, or at least 0.4, or at least 0.5, or at least 0.6, or at least 0.7, or at least 0.8, or at least 0.9, or at least 0.9, or at least 1 inch or more in length. As with the edges of the slots 13, the edges of the connectors 15, in this noun block 10 as well as other blocks of the system, are not square, but are beveled, angled, or rounded to enhance case of attachment and detachment to other blocks. The slots 12 and connectors 14 may also comprise additional elements 20 that aid in temporary attachment of the blocks. These include but are not limited to magnets 20, or other means of temporary attachment such as hook and loop fasteners like VELCRO. Blocks may also be fixed together in a semi-permanent or temporary manner with adhesives or other attachment means such as ring and hook, nails, or screws.

Further referring to FIGS. 1-2, the edges 16, or corners, of the noun block 10, as well as other example blocks described herein, where the faces 11 meet, are not square, i.e. do not form right angles. These edges 16 may be beveled, angled, or rounded to improve safety of the blocks. The noun block 10, as well as other example blocks herein, may comprise a visual cue 22 as illustrated in FIG. 1. Tactile or other cues 23 such as sound cues may be incorporated in the block in addition or instead of a visual cue 22. For example, a visual cue 22, a letter such as "N", a numerical indicator, graphical indicator, or image, or a word such as "NOUN" may be etched, embedded, or printed on a face 11 of the noun block 10. In other examples the cue may be tactile, having a different texture from the rest of the block, or having a raised or indented portion on the face 11, for example, the word noun could be depicted in Braile. The color of the noun block 10 or color of the visual cue 22 could also be tied to the part of speech of the block. For example, critical parts of speech such as a noun block 10 and verb block, may be one color, while auxiliary parts of speech such as adjectives and adverbs may be a different color. Visual and tactile cues may also be fixed to the block via semi-permanent or permanent attachment means including but not limited to magnets, hook and loop attachments, or adhesives. Sound cues may be produced by speakers mounted on the face 11 of the block 10, or integrated in the face of the block, or mounted inside the block and be connected to a processor, 24, and/or power means 28. The noun block 10 may further comprise a memory component.

In one example, a two-color scheme for the block set may be employed. One color may be used for the parts of speech that may be modified and the second for those that modify or connect other parts of speech. Parts of speech that may be modified include the noun, pronoun, not including the relative pronoun, intransitive and transitive verb, and auxiliary (helping) verb. Parts of speech that modify or connect include a linking verb, verbal, relative pronoun, adjective, adjective preposition, adverb, adverbial preposition or subordinate conjunction, adverbial conjunction (conjunctive adverb), article, coordinate conjunction, and correlative conjunction, in non-limiting examples. To avoid confusion between two grammatical systems used for teaching, if the adjective preposition, adverbial preposition or subordinate conjunction, coordinate conjunction, and correlative conjunction blocks are used to modify, then the alternate preposition or conjunction block should not be used.

Additionally referring to FIGS. 1-2, the noun block 10, as well as other blocks of the set, as listed in Table 2, may comprise electronic components including a processor 24, transmission/communication means 26, and power means 28 to receive, process, and transmit data related, for example, to input related to other blocks with which they may be paired, location, and other data, to a receiving device (not shown) that includes a transmission/communications means, processor, and power source. The system may be a receiving device that comprises a processor, memory, and power source, with software programmed to accumulate and organize data from the blocks, store data from the blocks in the memory, suggest alternate arrangement of the blocks, display arrangement of the blocks on a screen or graphics display comprising a graphical interface program, and/or produce auditory signals related to the location of blocks and/or direction for arrangement of blocks for visually challenged learners.

TABLE 2

Example Blocks of the System

Figure 3:
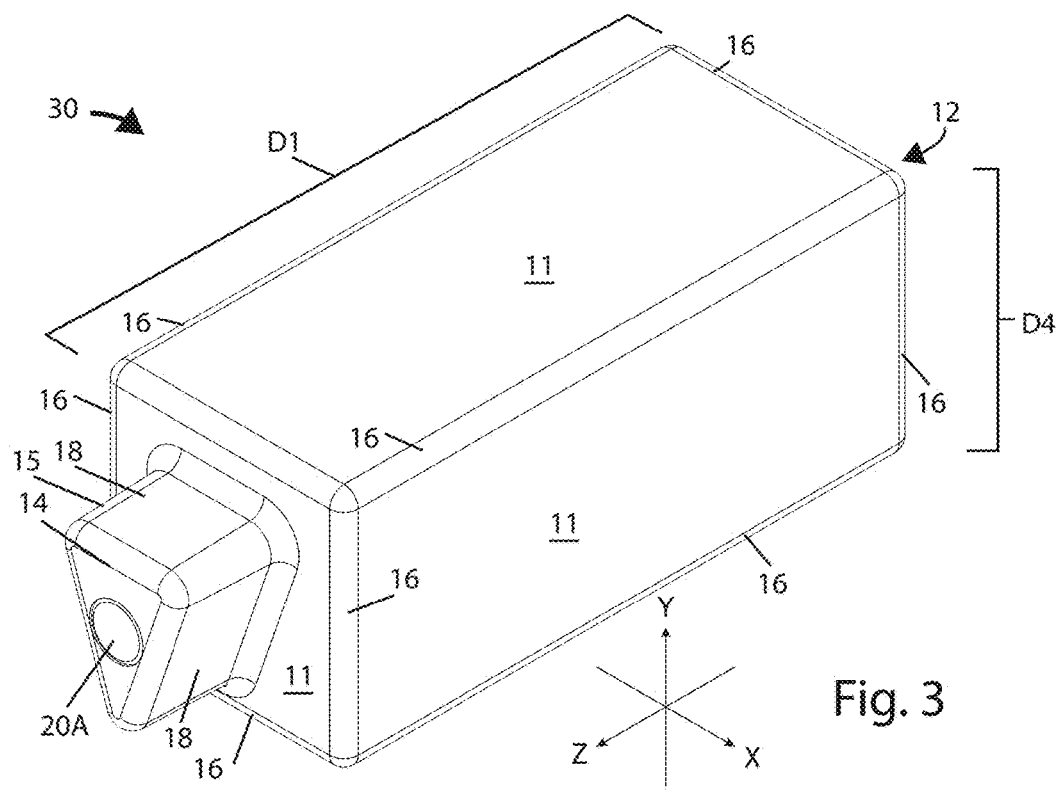
FIG. 3 is a perspective view of a second example hollow block of the present disclosure, representing, for example, an adjective preposition.
Figure 4:
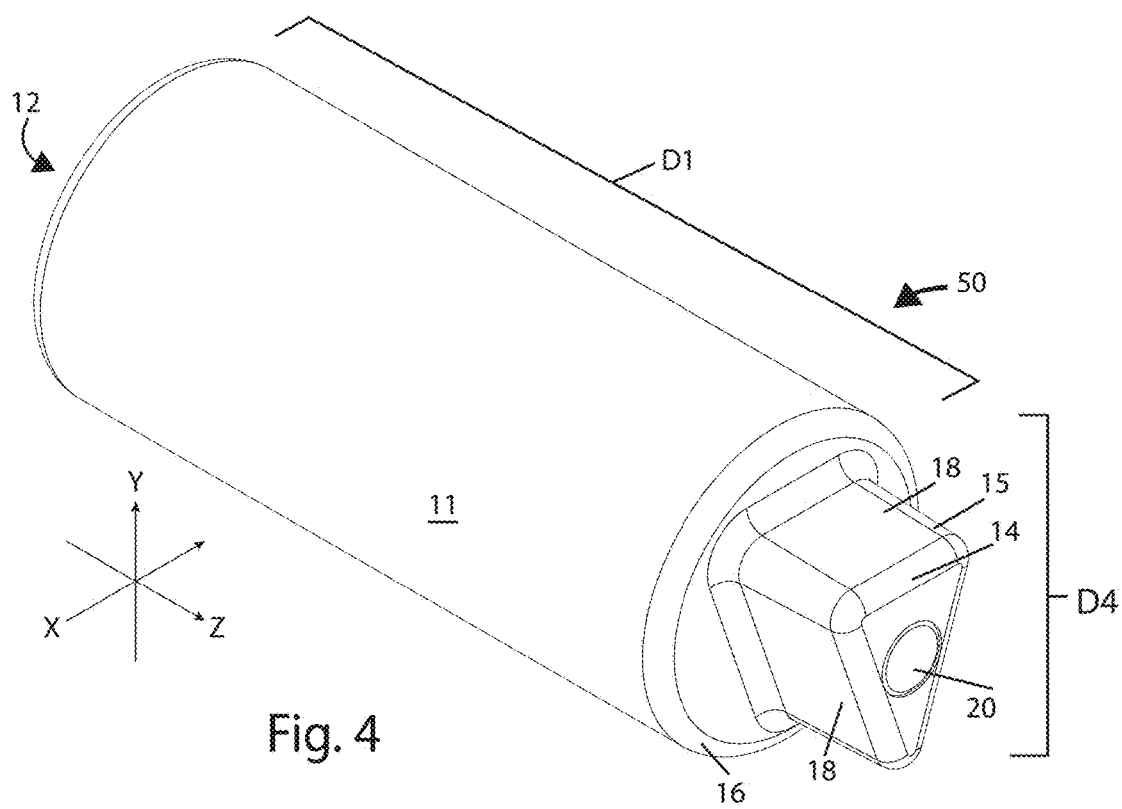
FIG. 4 is a perspective view of a third example hollow block of the present disclosure, representing, for example, an adverbial preposition or subordinate conjunction.
Figure 5:
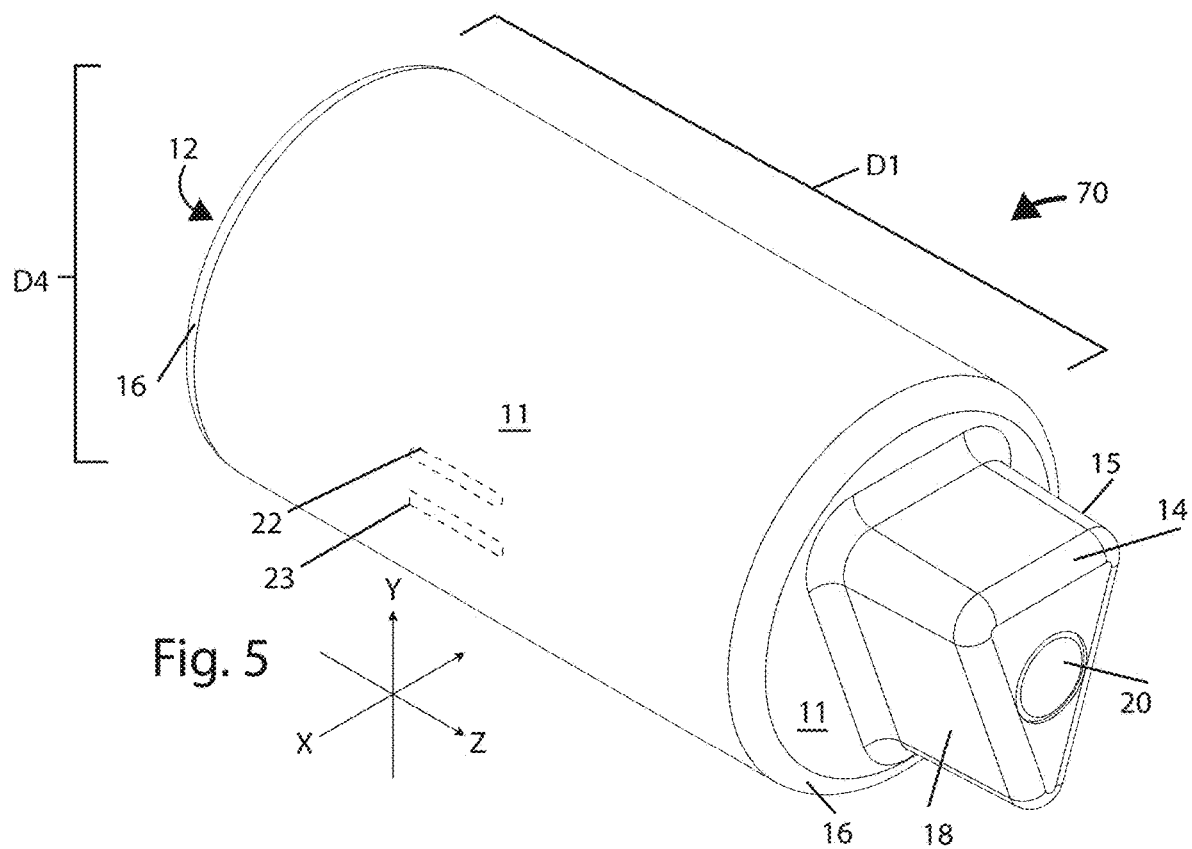
FIG. 5 is a perspective view of a fourth example hollow block of the present disclosure, representing, for example, an alternate preposition or conjunction.
Figure 6:
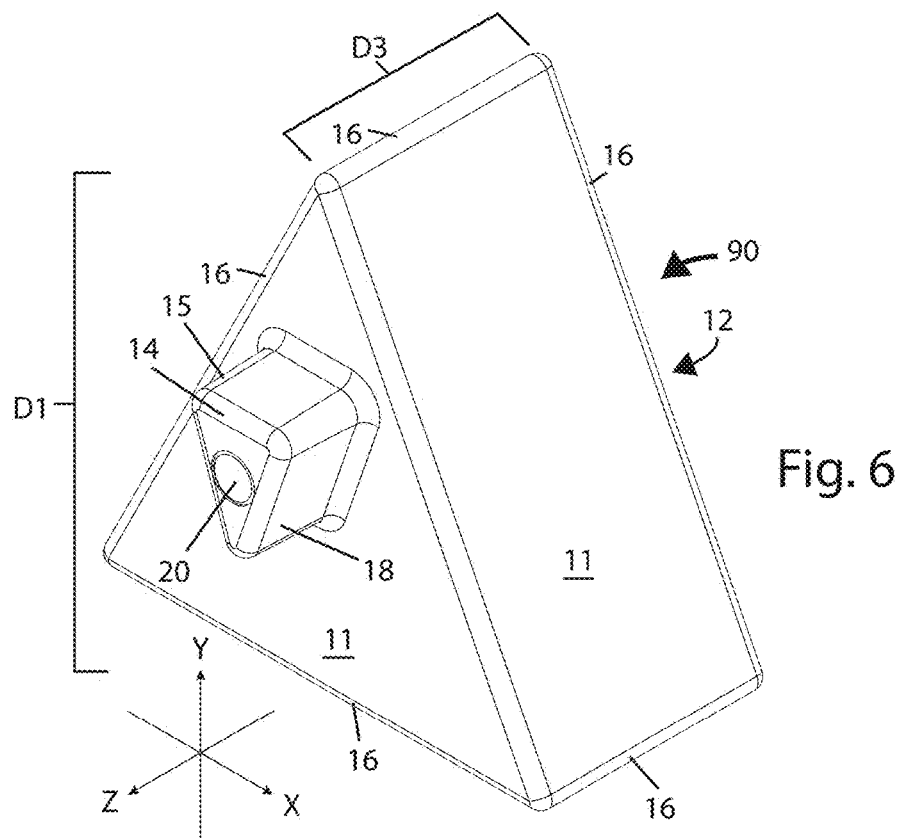
FIG. 6 is a perspective view of a fifth example hollow block of the present disclosure, representing, for example, an interjection.
Figure 7:
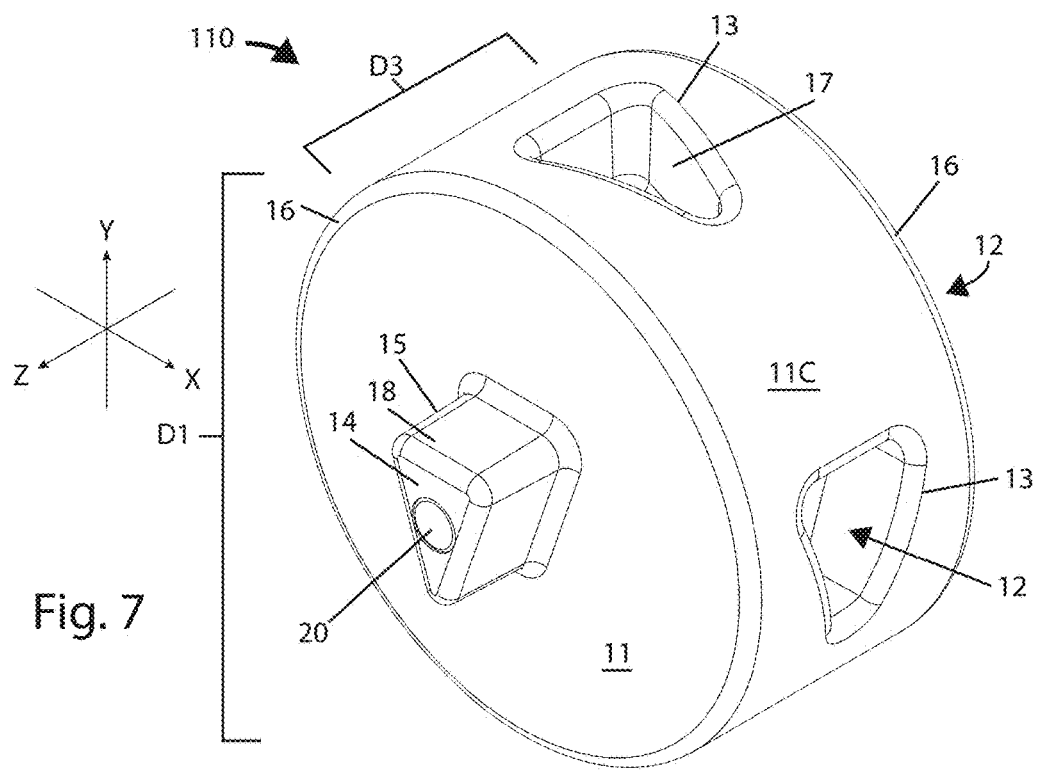
FIG. 7 is a perspective view of a sixth example hollow block of the present disclosure, representing, for example, an adverb.
Figure 8:
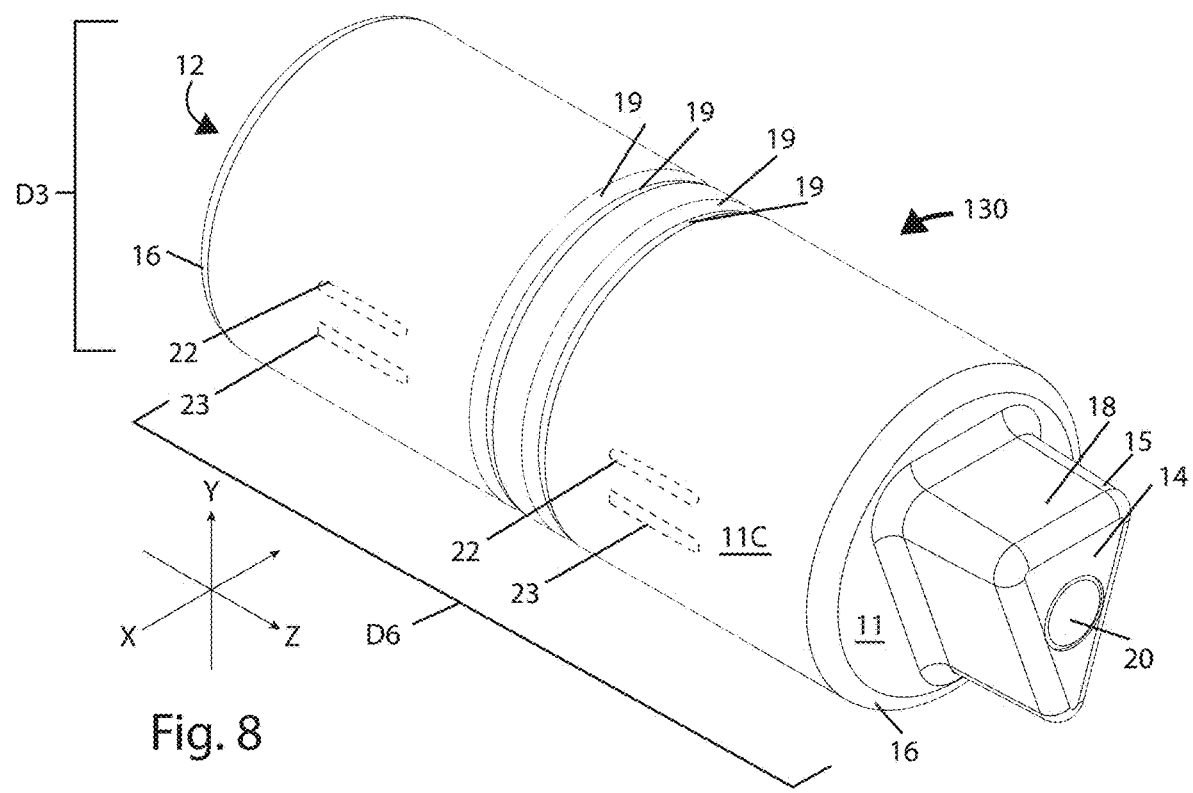
FIG. 8 is a perspective view of a seventh example hollow block of the present disclosure, representing, for example, a coordinate conjunction.
Figure 9:
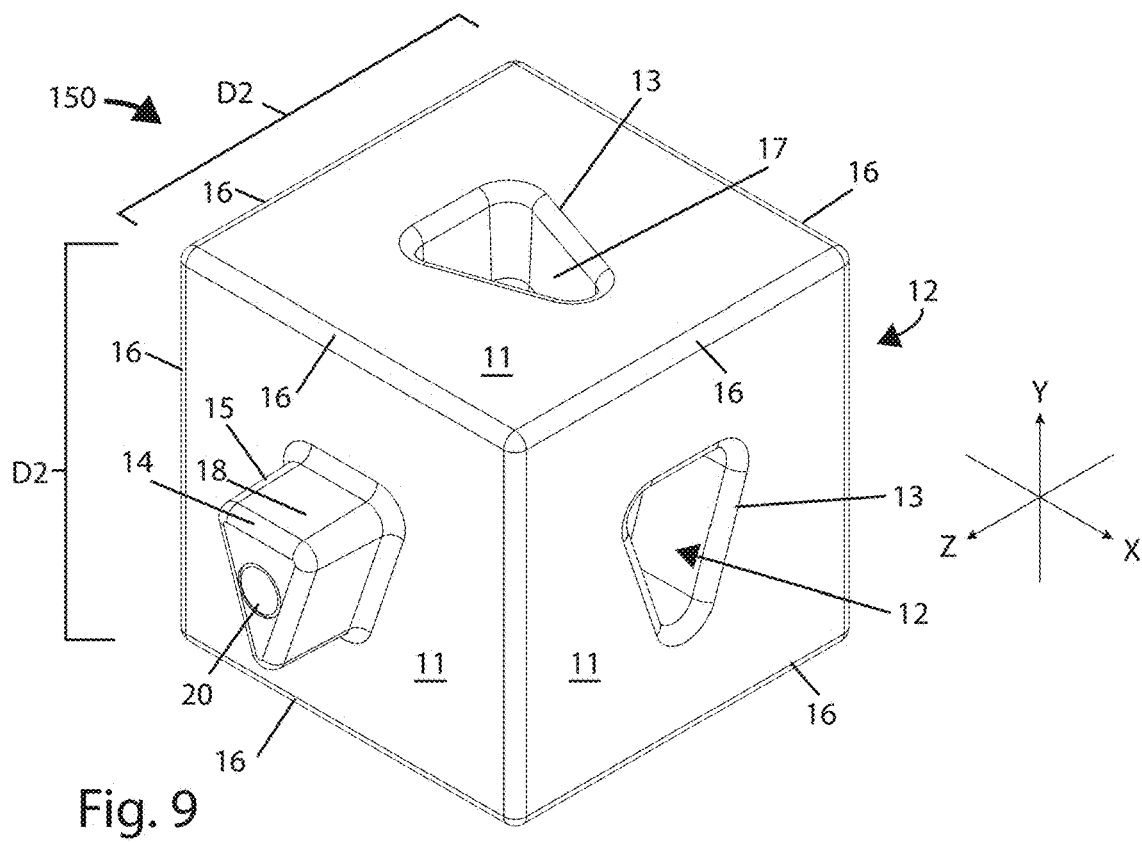
FIGS. 9-10 are perspective views of an eighth example hollow block of the present disclosure, representing, for example, two different forms of a pronoun.
Figure 10:
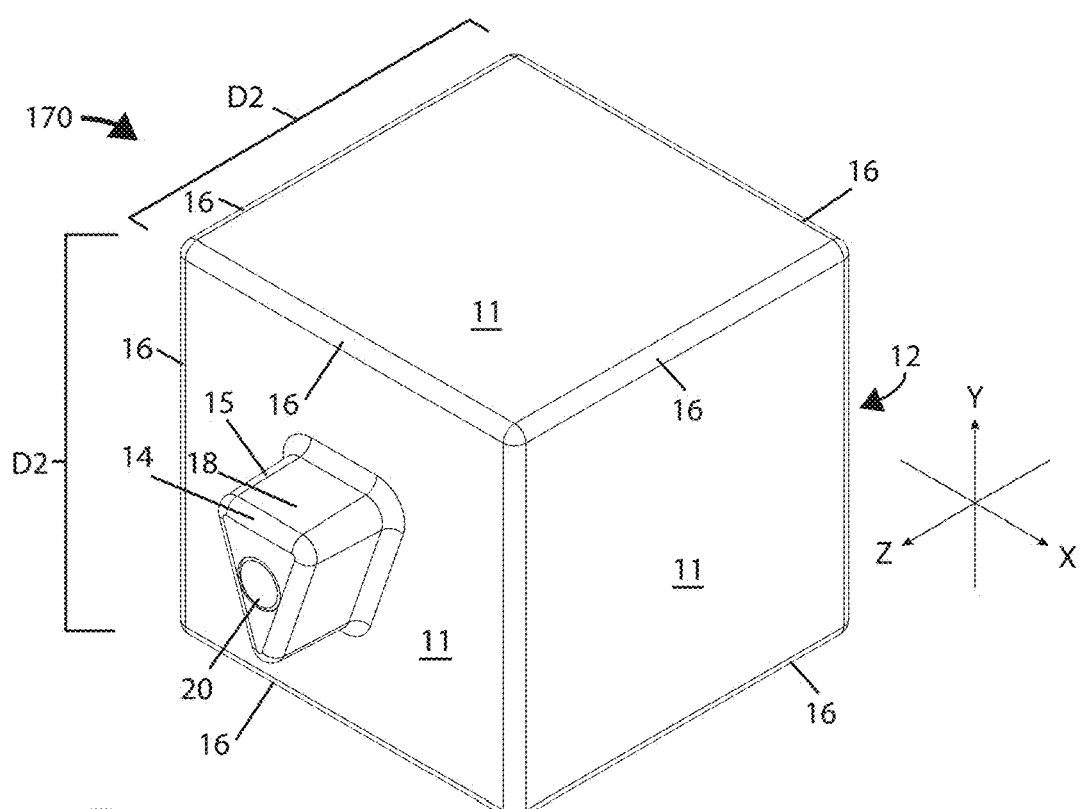
Figure 11:
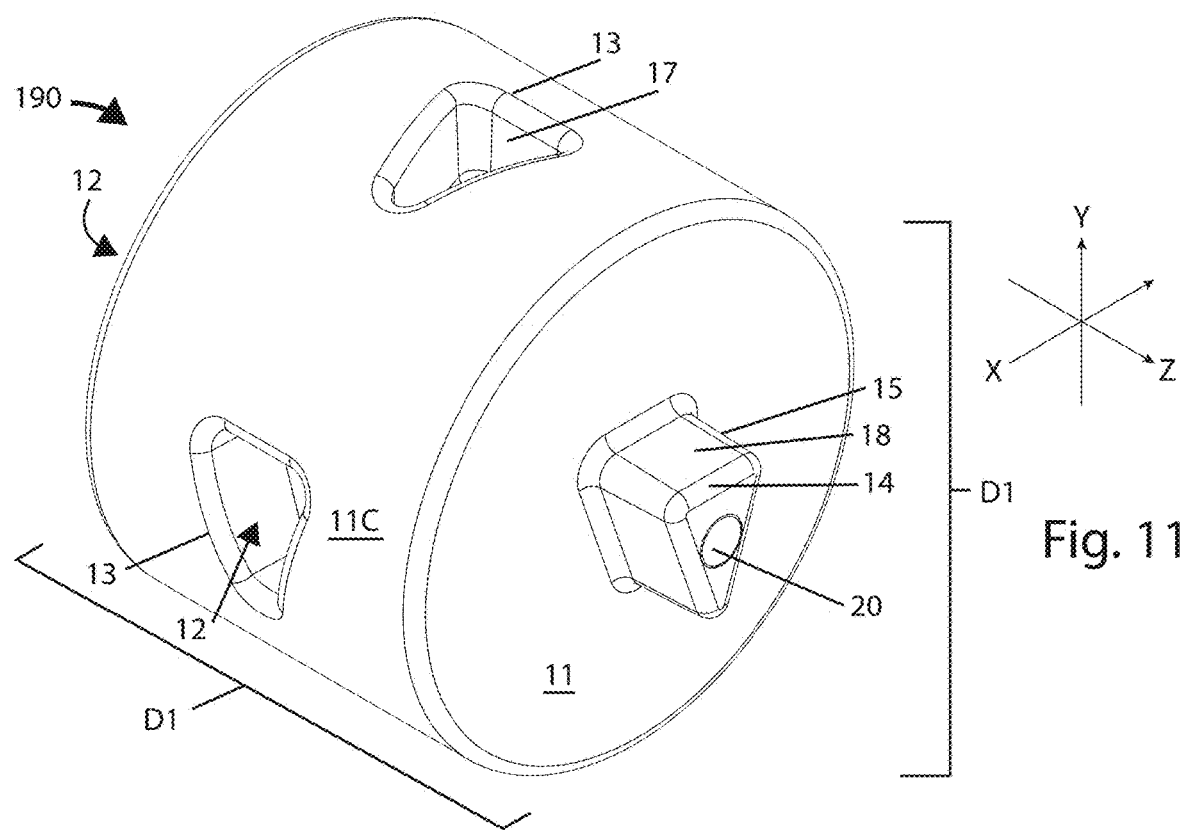
FIG. 11 is a perspective view of a ninth example hollow block of the present disclosure, representing, for example, an intransitive or transitive verb.
Figure 12:
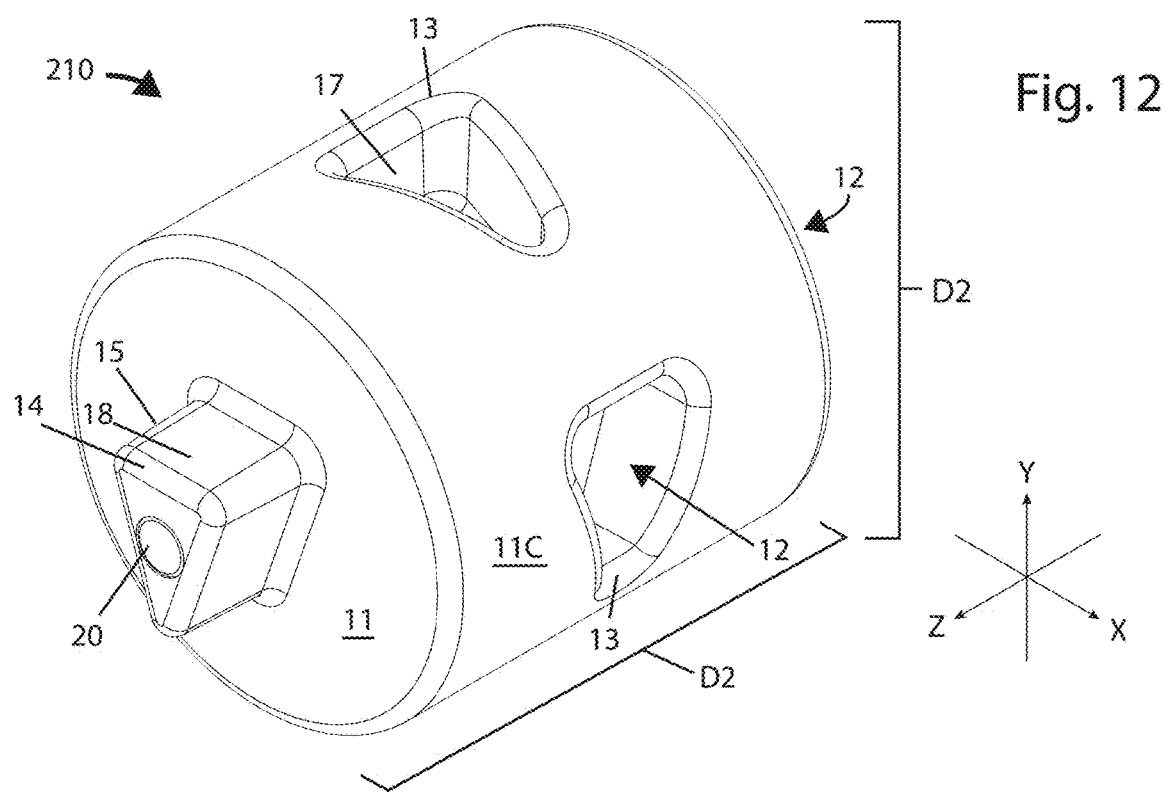
FIGS. 12-13 are perspective views of a tenth example hollow block of the present disclosure, representing, for example, two different forms of a verbal.
Figure 13:
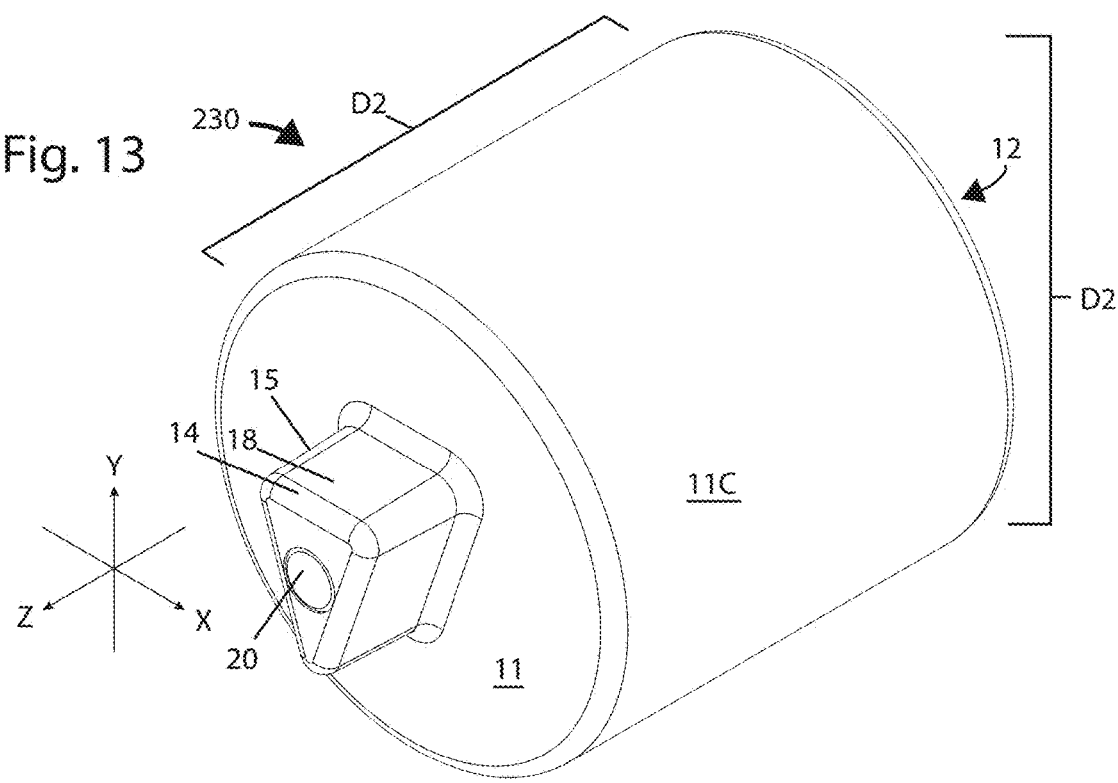
Figure 14:
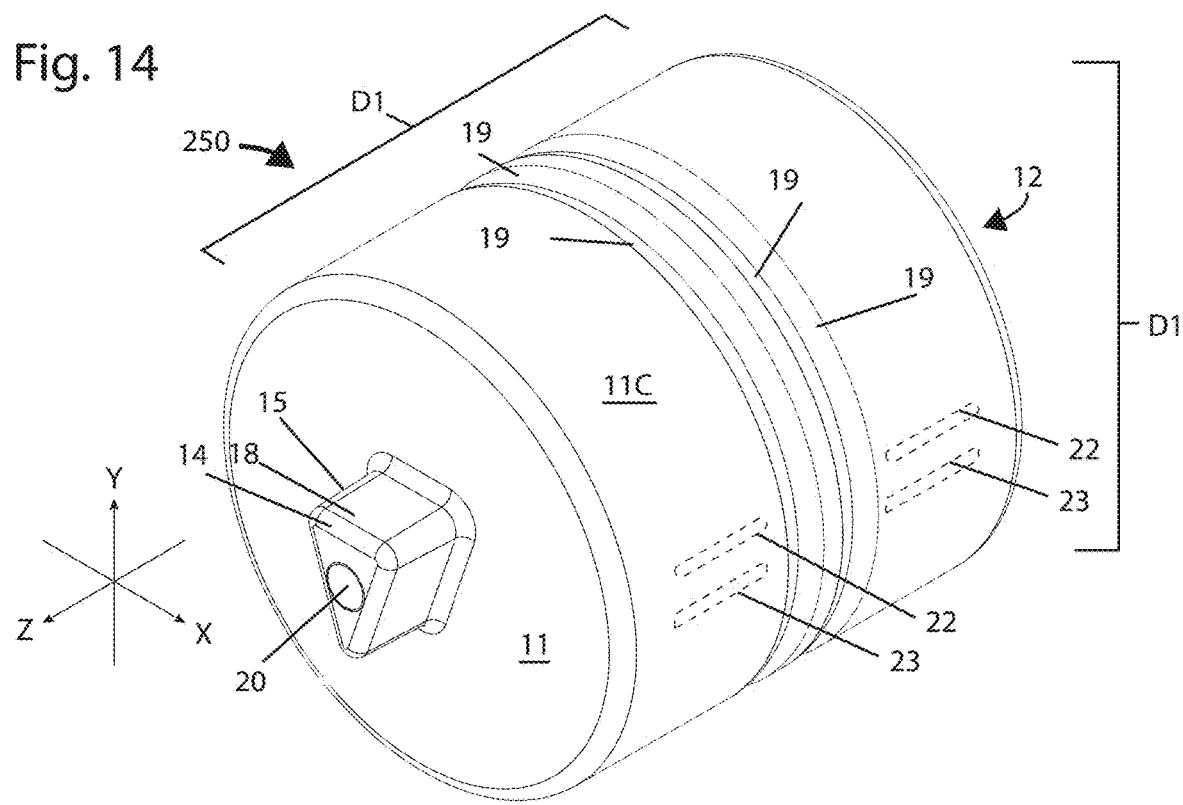
FIG. 14 is a perspective view of an eleventh example hollow block of the present disclosure, representing for example, a linking verb.
Figure 15:
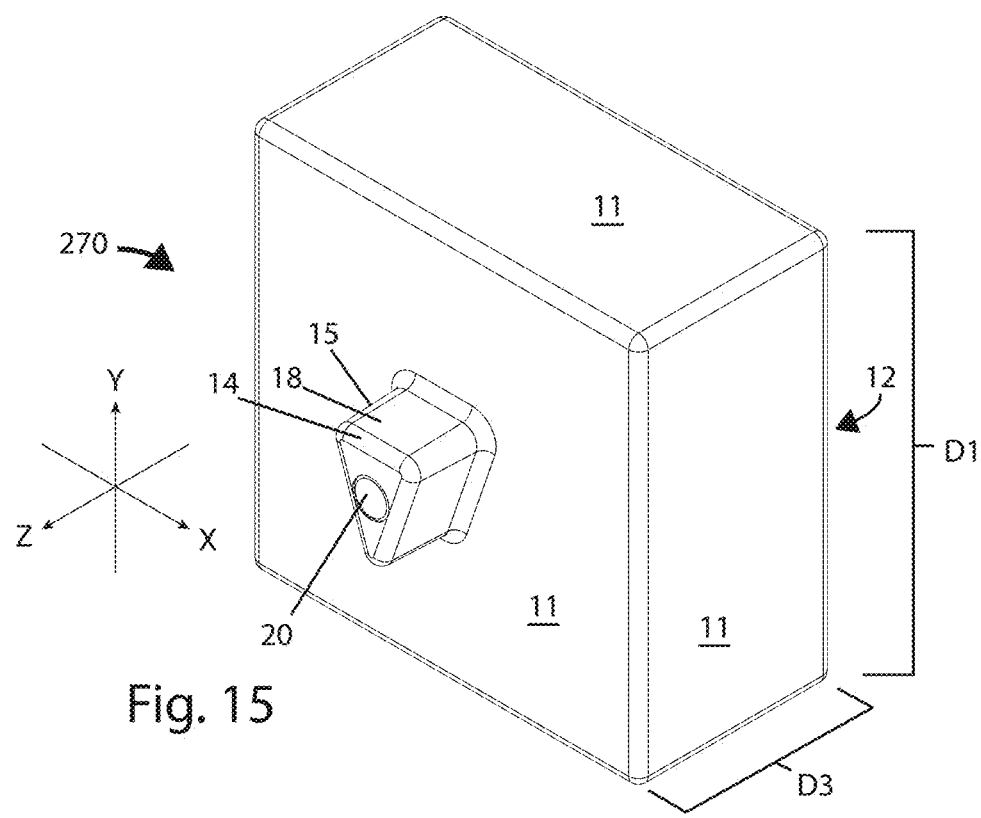
FIG. 15 is a perspective view of a twelfth example hollow block of the present disclosure, representing, for example, an article.
Figure 16:
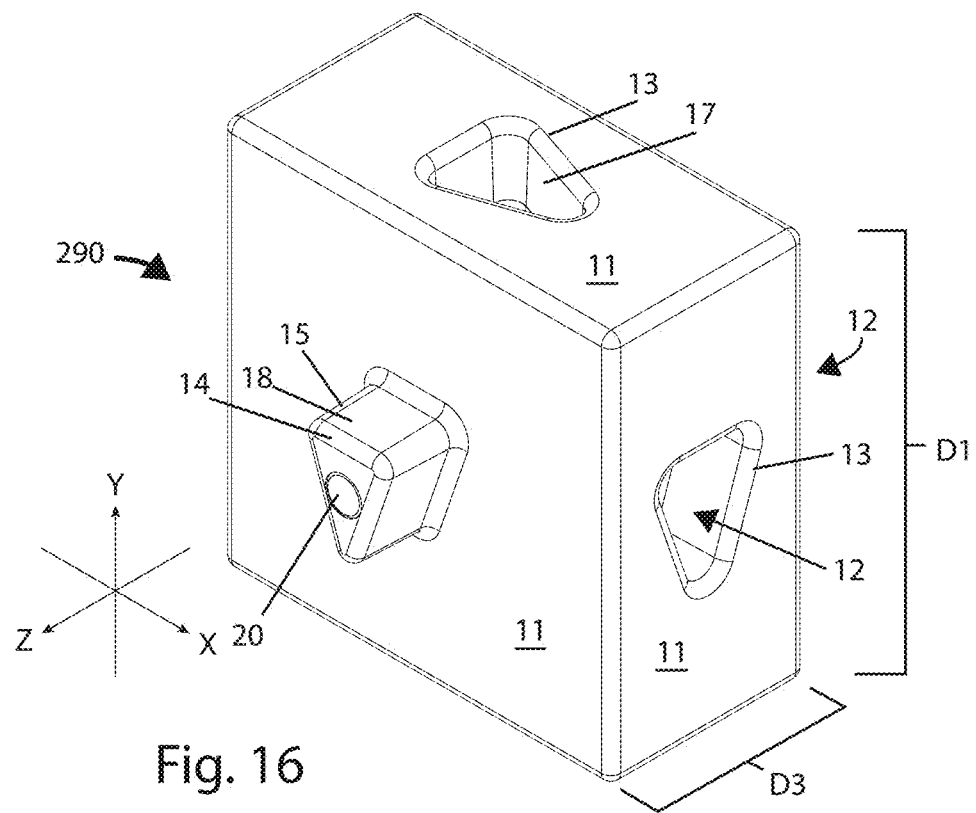
FIG. 16 is a perspective view of a thirteenth example hollow block of the present disclosure, representing, for example, an adjective.
Figure 17:
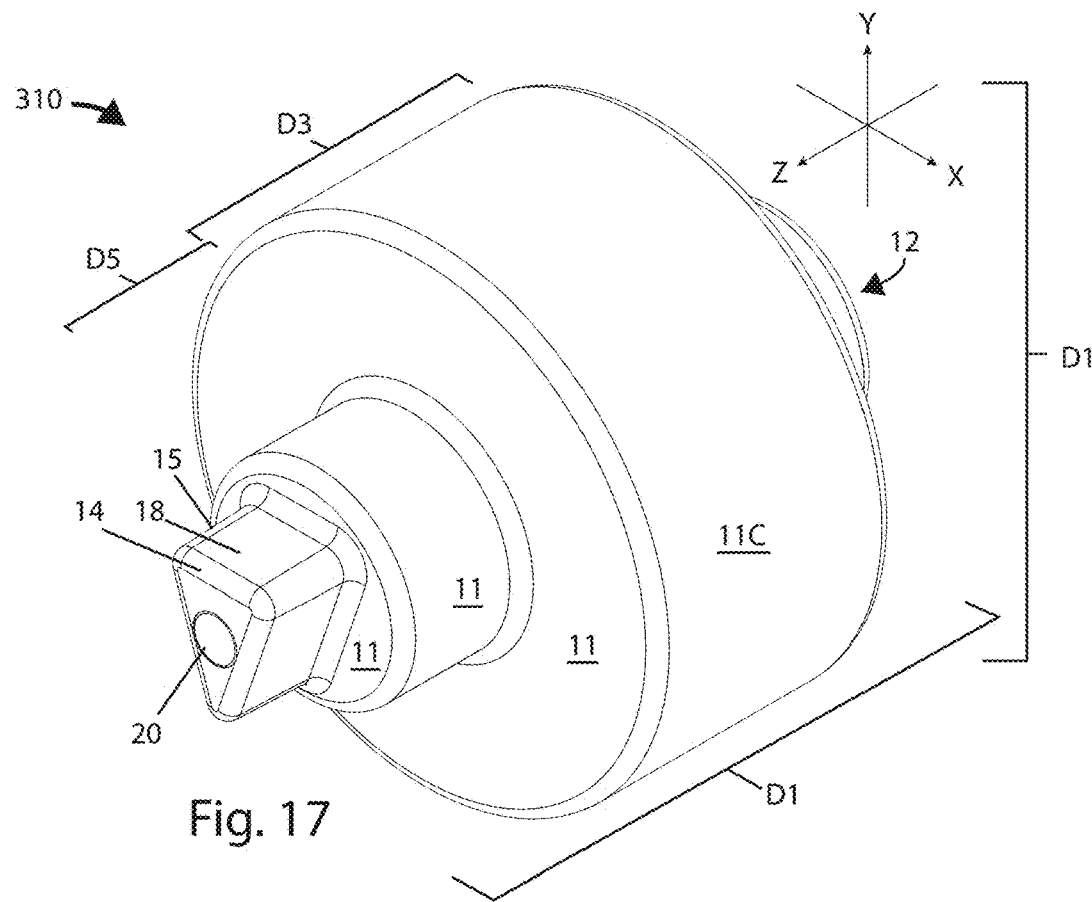
FIG. 17 is a perspective view of a thirteenth example hollow block of the present disclosure, representing, for example, an adverbial conjunction.
Figure 18:
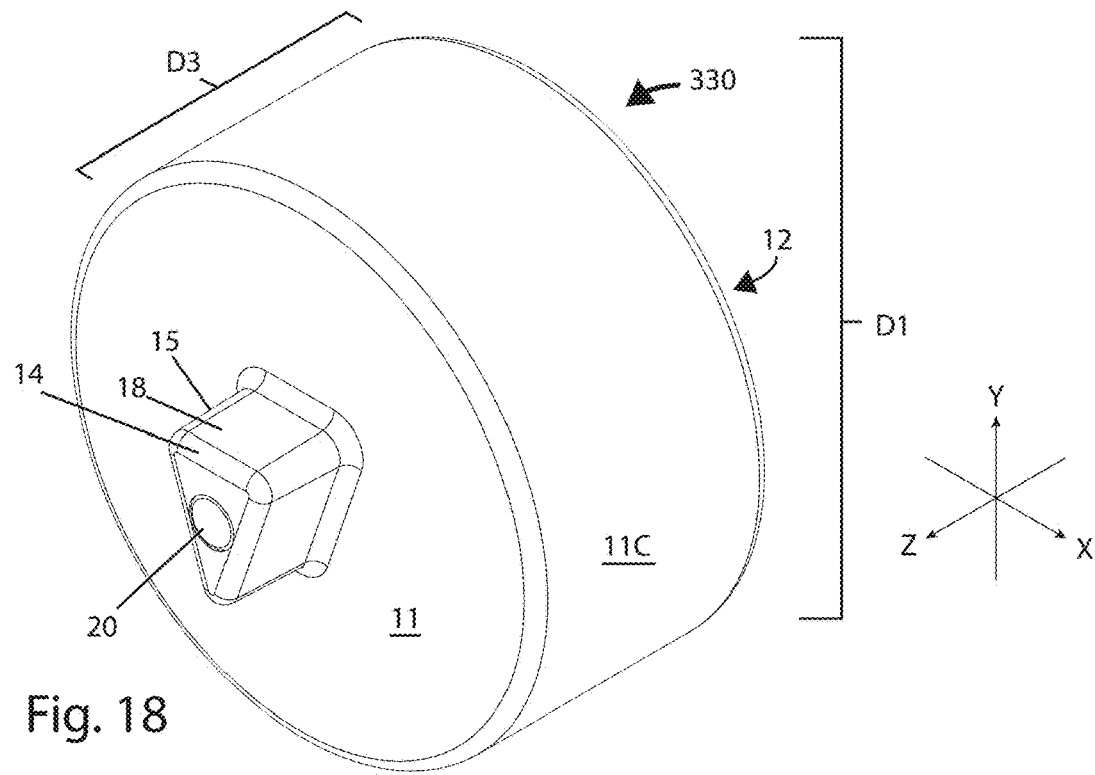
FIG. 18 is a perspective view of a fourteenth example hollow block of the present disclosure, representing, for example, an auxiliary verb.
Figure 19:
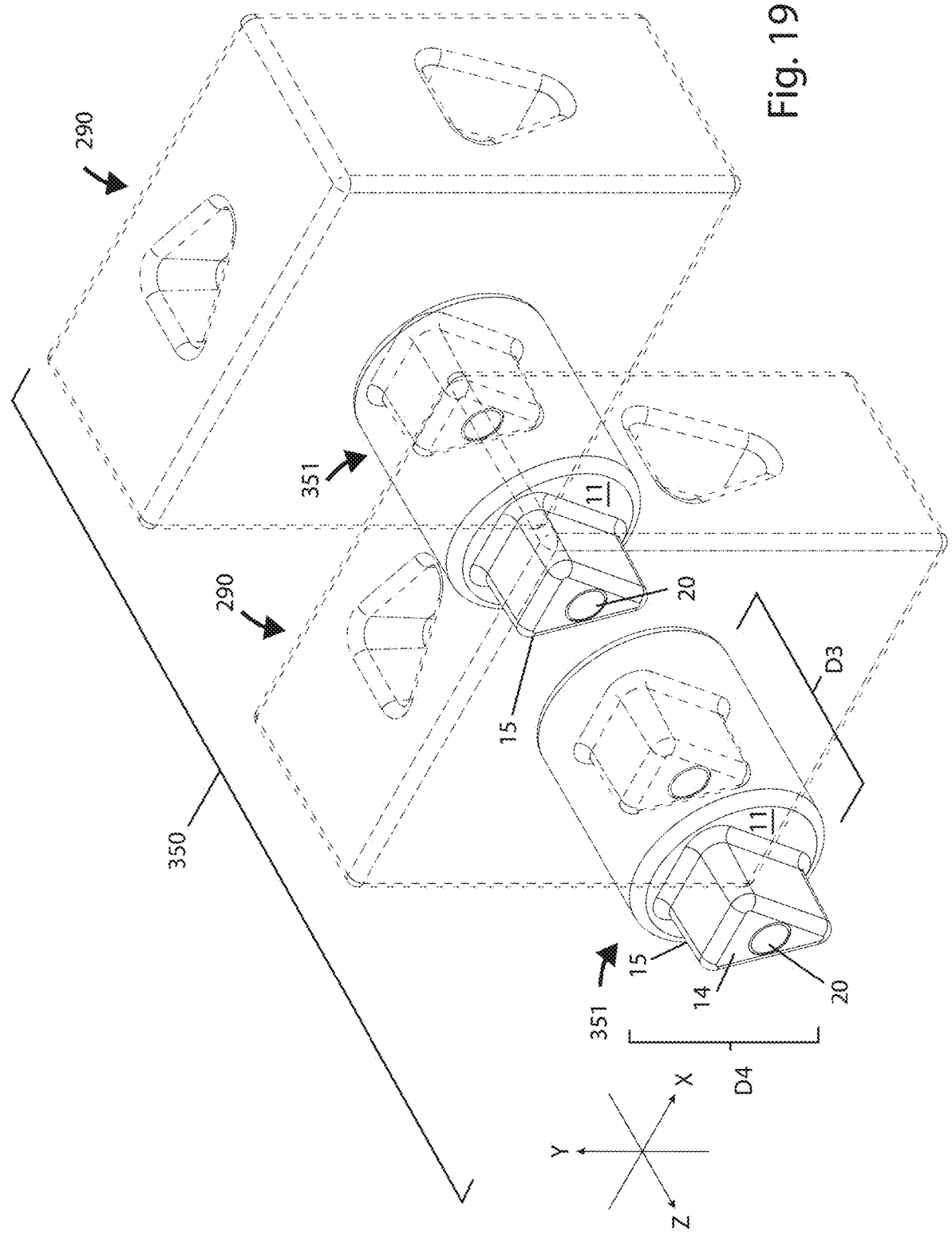
FIG. 19 is a perspective view of a fifteenth example hollow block of the present disclosure, representing, for example, a correlative conjunction.

| Grammatical Part of Speech | FIG., Numerical Identifier |
| --- | --- |
| noun | FIGS. 1-2, 10 |
| adjective preposition | FIG. 3, 30 |
| adverbial preposition or subordinate conjunction | FIG. 4, 50 |
| alternate preposition or conjunction | FIG. 5, 70 |
| interjection | FIG. 6, 90 |
| adverb | FIG. 7, 110 |
| coordinate conjunction | FIG. 8, 130 |
| pronoun | FIGS. 9-10, 150, 170 |
| intransitive or transitive verb | FIG. 11, 190 |
| verbal | FIGS. 12-13, 210, 230 |
| linking verb | FIG. 14, 250 |
| article | FIG. 15, 270 |
| adjective | FIG. 16, 290 |
| adverbial conjunction | FIG. 17, 310 |
| auxiliary verb | FIG. 18, 330 |
| correlative conjunction (2 blocks) | FIG. 19, 351 |

As depicted in FIG. 3, the system of the present disclosure also comprises at least one second example one-piece, hollow block 30 representing the adjective preposition. The adjective preposition block 30, is a 3D rectangle, or rectangular parallelepiped with a length D1 and height D4. The height of the adjective preposition block 30 may be at least 0.2 inches, or at least 0.3 inches, or at least 0.4 inches, or at least 0.5 inches, or at least 0.6 inches, or at least 0.7 inches, or at least 0.75 inches, or at least 0.8 inches, or at least 0.9 inches, or at least 1.0 inches, or at least 1.2 inches, or at least 1.4 inches, or at least 1.6 inches, or at least 1.8 inches, or at least 2.0 inches, or at least 2.5 inches, or at least 3.0 inches. In another definition, D4 may be at least one-fifth one-fourth, or at least one-third, or at least half, or at least three-fourths the distance of D1. The length of the second example block may be at least equal to D1. The adjective preposition block 30 comprises at least one connector 14 and at least one slot 12, and may alternately comprise additional attachment means on the connectors 20. In an example, the adjective preposition block 30 has one connector 14 and one slot 12 on opposing faces. As with block 10, FIG. 1, the edges of the block 16 are beveled, rounded, or angled. In addition, the edges of the connectors 15 are beveled, angled, or rounded to facilitate connecting with the slots of other blocks.

As depicted in FIG. 4, the system of the present disclosure comprises at least one third example one-piece, hollow block 50, or at least two third example blocks 50, representing the adverbial preposition or subordinate conjunction.

The third example block 50 may comprise at least one slot 12, and at least one connector 14, or at least two connectors 14, with or without additional connecting means 20. As an example, the adverbial preposition block 50 has one connector 14 and one slot 12 on opposing faces. The third example block 50 may be cylindrical in form with edges 16 between the faces, as well as connector edges 15 being beveled, angled, or rounded. A connector 14 of the third example block 50 is positioned on one face 11 with a slot 12 on the opposing end. The length D1 of the cylinder of the third example block 50 may for instance be at least one-half inch, or one inch, or 1.5 inches, or 2 inches, or 2.5 inches, or 3 inches, or 3.5 inches, or 4 inches, 5 inches, or 6 inches. The diameter of the cylinder or height of the third example block 50 may be a height of D4.

As depicted in FIG. 5, the system comprises at least one fourth example block 70, or at least two fourth example one-piece, hollow blocks 70, representing an alternative preposition or conjunction. The fourth example block 70 is represented by a cylinder of length D1 and diameter or height of D4. The fourth example block 70 may be cylindrical in form with edges 16 between the faces, as well as connector edges 15 being beveled, angled, or rounded. The fourth example block 70 comprises at least one connector 14 on one end face 11 of the block 70. A slot 12 is positioned on the opposing face. The fourth example block further comprises at least one unique marker, being tactile 23, auditory, and/or visual cue 22 as an identifier.

As depicted in FIG. 6, the system comprises at least one fifth example one-piece, hollow block 90, representing the interjection. The fifth example block is in the form of a triangular prism with height of D1 and width or depth of D3. The width D3 may be at least 0.25 inches, or 0.5 inches, or 0.75 inches, or 1.0 inches, or 1.2 inches, or 1.25 inches, or 1.3 inches, or 1.4 inches, or 1.5 inches, or 1.6 inches, or 1.7 inches, or 1.75 inches, or 1.8 inches or 1.9 inches, or 2 inches, or 2.5 inches. The interjection block 90 comprises at least one connector 14 and at least one slot 12 on opposing faces 11.

As depicted in FIG. 7, the system comprises at least one sixth example one-piece, hollow block 110, representing the adverb. The adverb block 110 is in the shape of a cylinder with width of D3 and height D1. The adverb block comprises at least one connector 14, and at least one, at least two, at least three, at least four, or at least five slots 12 on the cylindrical face 11C, and or the opposing face 11 from the connector.

As depicted in FIG. 8, the system comprises at least one seventh example one-piece, hollow block 130, representing the coordinate conjunction. The coordinate conjunction block 130 is of cylindrical form with height or diameter of D3 and length of D6. Length of D6 may be for instance at least one inch, or 1.25 inches, or 1.5 inches, or 2 inches, or 2.25 inches, or 2.5 inches, or 3 inches, or 3.5 inches, or 4 inches or more. The coordinate conjunction block 130 comprises at least one connector 14 on an end face 11. The coordinate conjunction block 130 comprises a slot 12 on the opposing face from the connector 14. In addition, the coordinate conjunction block 130 comprises a tactile cue 23 that may be grooves, indentations, or raised rings 19 that circle the cylinder on the cylindrical face 11C. Optionally the coordinate conjunction block 130 may also comprise a unique marker being a visual clue 22, tactile cue 23, or sound cue as described previously. In an alternate embodiment, the coordinate conjunction block 130 may share a cue with the linking verb 250, described and shown in FIG. 14.

As depicted in FIGS. 9-10, the system comprises at least one eighth example one-piece, hollow block 150, 170 representing a pronoun. The pronoun block 150, 170 is represented by a cube having a side or face 11 length of D2. Length or dimension D2 may be at least 0.25 inches, or at last 0.5 inches, or at least 0.6 inches, or at least 0.7 inches, or 0.8 inches, or 1 inch, or 1.2 inches or 1.25 inches or 1.3 inches, or 1.5 inches, or 1.75 inches, or 2 inches, or 2.5 inches, or more. The pronoun 170 may have at least one connector 14, and at least one slot 12 (not shown) as depicted in FIG. 10. The pronoun 150 may have at least one connector 14, and at least two slots 12, or at least three slots 12 (not shown), as depicted in FIG. 9.

As depicted in FIG. 11, the system comprises at least one ninth example one-piece, hollow block 190 representing a verb, being either an intransitive or transitive verb represented by the at least one block 190. The verb block 190 has height/diameter of D1 and length of D1 and is cylindrical in form. The verb block comprises at least one connector 14 and a slot 12 on opposing sides. The verb block comprises at least one slot 12, or at least two slots 12, or at least three slots (not shown) on the cylindrical face 11C.

As depicted in FIGS. 12-13, the system comprises at least one tenth example one-piece, hollow block 210, 230 representing a verbal. The verbal block 210, 230 has a height/diameter of D2 and length of D2. The verbal block 210 in one form shown in FIG. 12 comprises at least one connector 14, and at least one slot 12 on the opposing face, as well as an additional slot 12 on the cylindrical face 11C, or at least two additional slots 12, or at least three additional slots (not shown), or more. The verbal block in a second form 230 shown in FIG. 13, comprises at least one connector 14 and only one slot 12 on the opposing face.

As depicted in FIG. 14, the system comprises at least one eleventh example one-piece, hollow block 250 representing a linking verb. The linking verb block 250 has a height/diameter of D1 and length of D1. The linking verb block 250 comprises at least one connector 14 and at least one slot 12 on opposing faces. The linking verb block 250 comprises a tactile cue 23, which may be located on the cylindrical face 11C, which may be indentions, grooves, or raised rings 19 circling the cylinder to differentiate it from the intransitive or transitive verb 190. Additionally, or optionally, the linking verb block may optionally comprise visual cues 22, or other tactile 23, or sound cues.

As depicted in FIG. 15, the system comprises at least one twelfth example one-piece, hollow block 270 representing an article. The article block 270 has a height of D1 and length of D3 and is represented by a rectangular prism or parallelepiped. The article block 270 comprises one slot 12 and one connector 14 on opposing sides of the block for connection to other blocks.

As depicted in FIG. 16, the system comprises at least one thirteenth example one-piece, hollow block 290 representing an adjective. The adjective block 290 has a height of D1 and length of D3 and is represented by a rectangular prism or parallelepiped. The adjective block 290 comprises at least one connector 14 and at least one slot 12, or at least two slots 12 on opposing faces 11, as well as additional slots 12 on other faces 11, totaling at least three slots 12, or at least four slots (not shown), or at least five slots (not shown). In one example, the adjective block 290 has one connector 14 and one slot 12 on opposing faces, and four additional slots 12.

As depicted in FIG. 17, the system comprises at least one fourteenth example one-piece, hollow block 310 representing an adverbial conjunction, also termed a conjunctive adverb. The adverbial conjunction block 310 comprises at least one connector 14 and one slot on opposing faces 11 and has a height of D1 and width of D2, wherein the block itself comprises a width of D3, and a protruding face 11C, holding a connector 14 and slot 12, on opposing faces 11, equaling a width of D5. In other terms the adverbial conjunction block 310 has one middle section with height of D1 and width of D3, protruding sections from the middle section have width of D5 to form an overall width of D1, not including the width of the connector 14. For spacing purposes, the connectors 14 of the adverbial conjunction block 310 comprise additional spacers 29 that provide room within the block 310 for the optional processor, transmitter, and power source. The spacer 29 length D5 may be at least 0.05 inches, or at least 0.1 inches, or at least 0.15 inches, or at least 0.2 inches, or 0.3 inches, or 0.4 inches, or 0.5 inches, 0.6 inches, 0.7 inches or 0.75 inches or 0.8 inches or 0.9 inches, or 1 inch, or 1.2 inches or 1.5 inches, or more.

As depicted in FIG. 18, the system comprises at least one fifteenth example one-piece, hollow block 330 representing an auxiliary verb, also termed a helping verb. The auxiliary verb block 330 comprises at least one connector 14 and at least one slot 12 on opposing faces 11. The auxiliary verb block 330 has height of D1 and length of D3.

As depicted in FIG. 19, the system comprises at least two sixteenth example one-piece, hollow blocks 351 together representing a correlative conjunction 350. The system may comprise at least one set of the blocks being two blocks 351, or at least two sets or more. The correlative conjunction is represented by blocks 351, shown in solid lines here, and are paired with two adjective blocks 290 represented by dashed lines. The internal components are shown for the adjective blocks 290 giving examples of how blocks pair together with connectors 14 fitting into slots (not shown) of connecting blocks. Additional connection means 20 such as magnets or other semi-permanent or temporary connection aids may be employed. Angled, or beveled edges or corners 15 of the connectors aid in pairing the blocks. The correlative conjunction blocks 351 may be represented by cylinders of length of D3 and height or diameter of D4.

Methods of identifying blocks of the system need not be limited to visual or tactile cues affixed or embedded on the block. Visual and or tactile groupings or indications may be made via color-coding or coding with a tactile or textural element, numbers, letters, words, and/or with an electronic signature embedded in the block. In addition, as indicated before, sound cues may be employed.

The blocks may comprise sensors, processors, display, and power means housed in their hollow forms such that they may sense position and connection to other blocks of the system and display data or signal about positions and connections whether the display or signal comprise a light, sound, or motion.

Figure 20:
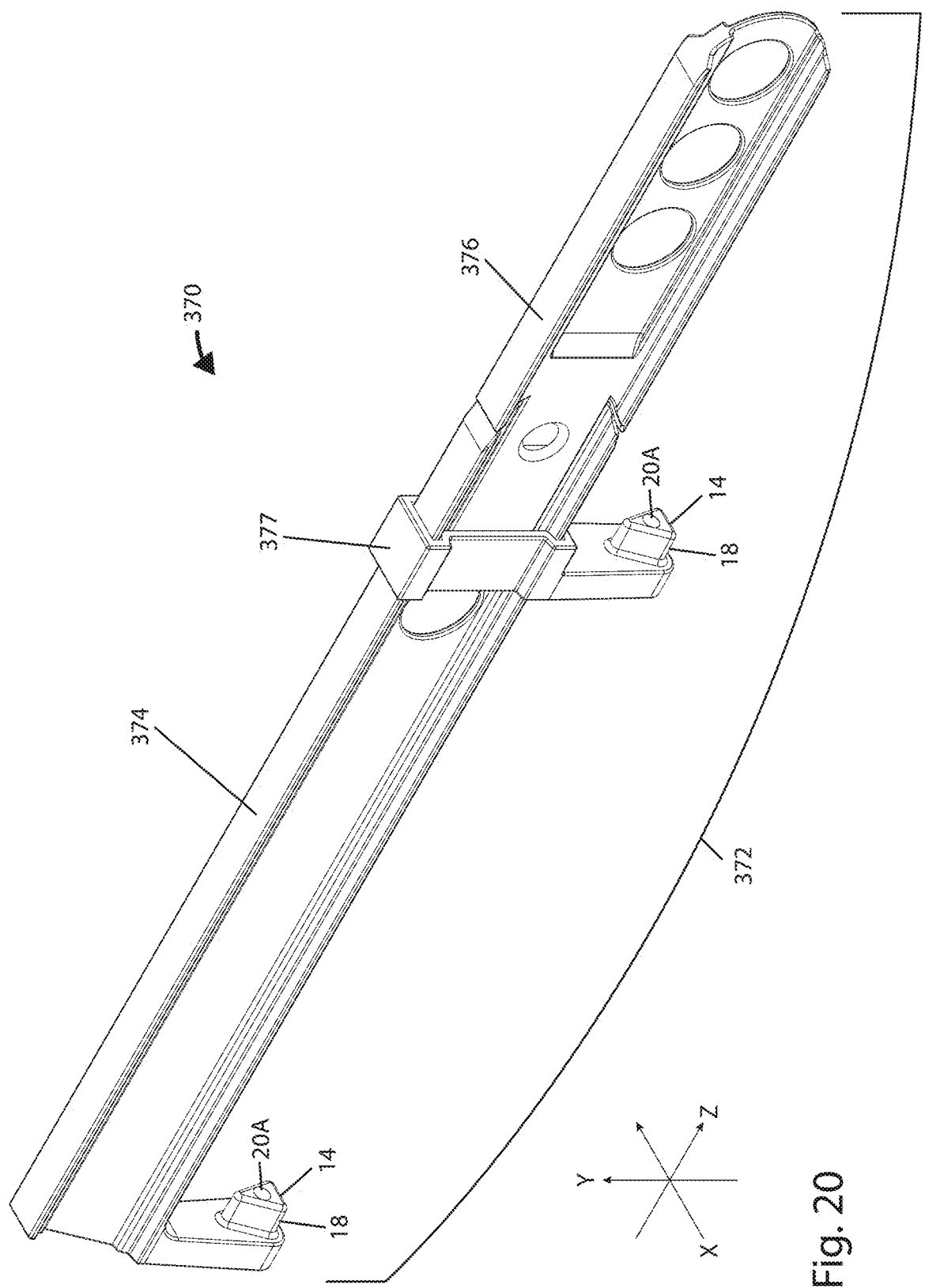
FIG. 20 is a perspective view of an adjustable frame of the present disclosure.
Figure 21:
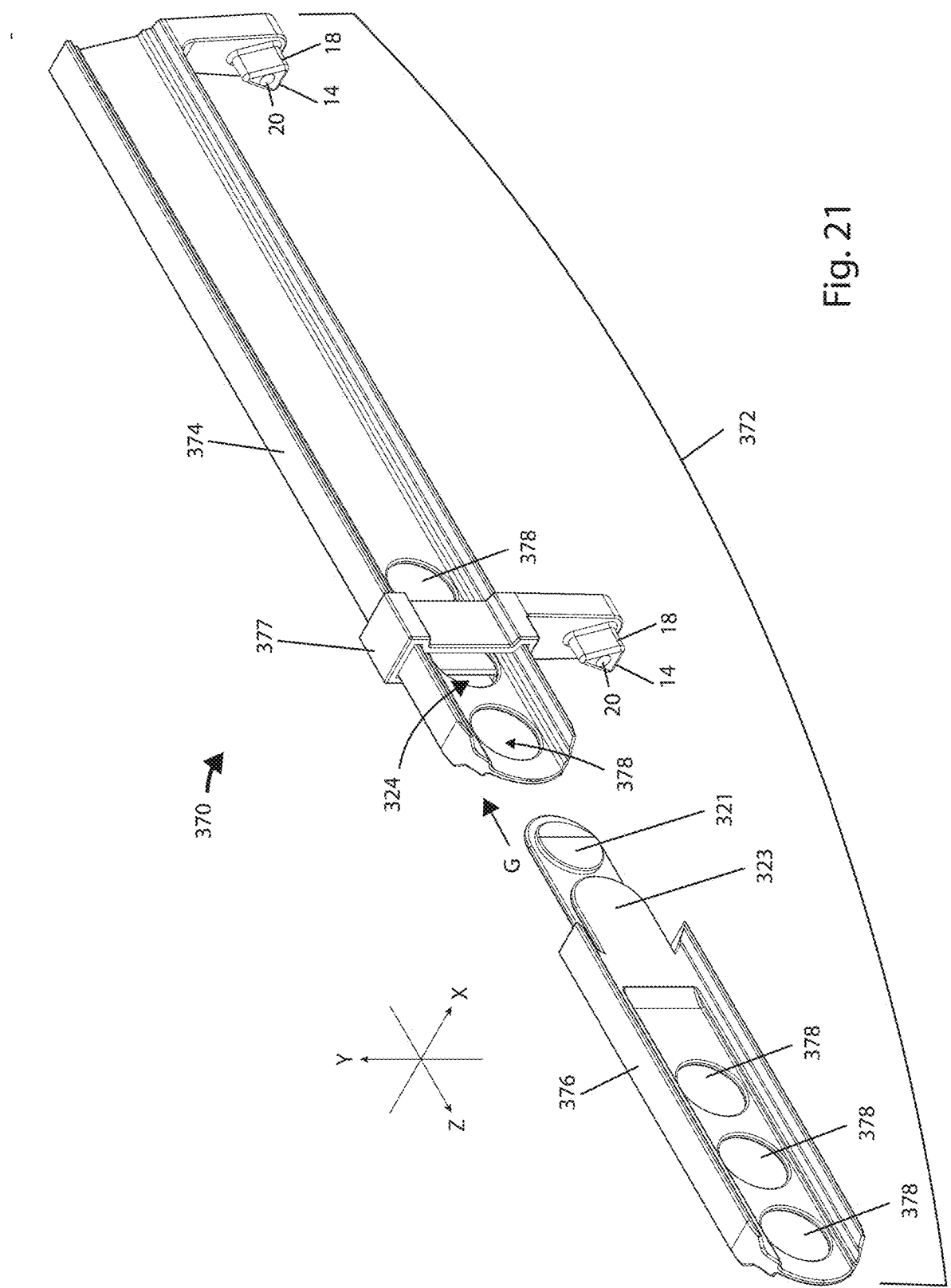
FIG. 21 is an illustration of another arrangement of the adjustable frame.

As depicted in FIGS. 20-21, the system may optionally and/or additionally comprise an adjustable frame 370 to hold one or more blocks. As shown in FIG. 20, an extendable arm 372 comprises, at one end, a stationary arm 374. The stationary arm 374 comprises a connector 14 with rounded, beveled, or angled edges 15 of appropriate shape and size to connect with a block or series of blocks connected together. The connector 14 may further comprise a magnet 20 or other additional means of securing the blocks. The adjustable frame comprises a reduction clamp 377 to secure one or more blocks in place at a second end that comprises a slot 12 (not shown) to receive a connector 14 of a block on one side and a connector 14 to pair with a slot 12 of a block on the other side. The reduction clamp 377 slides onto the stationary arm and arm extension 374, 376 to pair with a block to hold at least one block, or two blocks, or several blocks in place. The reduction clamp may be reversed to accommodate a slot or connector of one or multiple blocks paired together depending on arrangement of blocks. The extendable arm 372 is grooved for movement of the reduction clamp 377 but other designs for this function may be envisioned.

For use, as illustrated in FIG. 21, the arm extension 376 is fitted on the stationary arm 374. A button 321, or protrusion, in the arm extension 376 fits into a hole 378 in the stationary arm 374. Holes 378, at least one, or at least two, or at least three, or at least four, or at least five, or at least six, or more, in the extendable arm 372 allows for extension of the arm 372, as illustrated in FIG. 21, as well as fingers or other instruments to slide therethrough holding and/or securing the adjustable frame 370. Holes 378 may be varied in shape and size to fit fingers or notches 321 of different sizes and shapes or serve as means of holding the adjustable frame 370. A cover 323 may fit over the button 321 once the button 321 is secured in a hole 378. The adjustable frame 370 may be fitted with sensors, processors, transmitters, and power source to sense and transmit data about the blocks of the system to other components of the system not limited to blocks, wand, glove, table, and/or connected devices and displays. Images or data of block configurations may be stored for later viewing. Further, the adjustable frame 370 may be insulated or made of an insulating material to protect from and/or prevent electrical discharges to a user's band. The adjustable clamp 370 may further comprise a block storage means (not shown).

FIGS. 22-24 show a perspective view, FIG. 22, left side view, FIG. 23, and right side view, FIG. 24, of an optional wand 390 of the system. The wand 390 comprises a handle 392 and a pointer 394. The handle 392 and/or pointer 394 may store a sensor(s) or receiver(s) (not shown) for sending or receiving data about the blocks, their positions, and relationship to one another. The wand comprises a processor for processing data and deciding on an action based on the data and a pre-programmed software stored in the processor and/or a contained memory unit or another connected, either wired or wirelessly processor and memory unit. The wand comprises a signaling device 396 for taking the action, wherein the action produced by the signaling device may be producing light, sound, or motion, in the form for instance of a vibration. Additionally, the wand may comprise a transmitter for conveying data to a separate processor and memory unit, and a power source.

Figure 25:
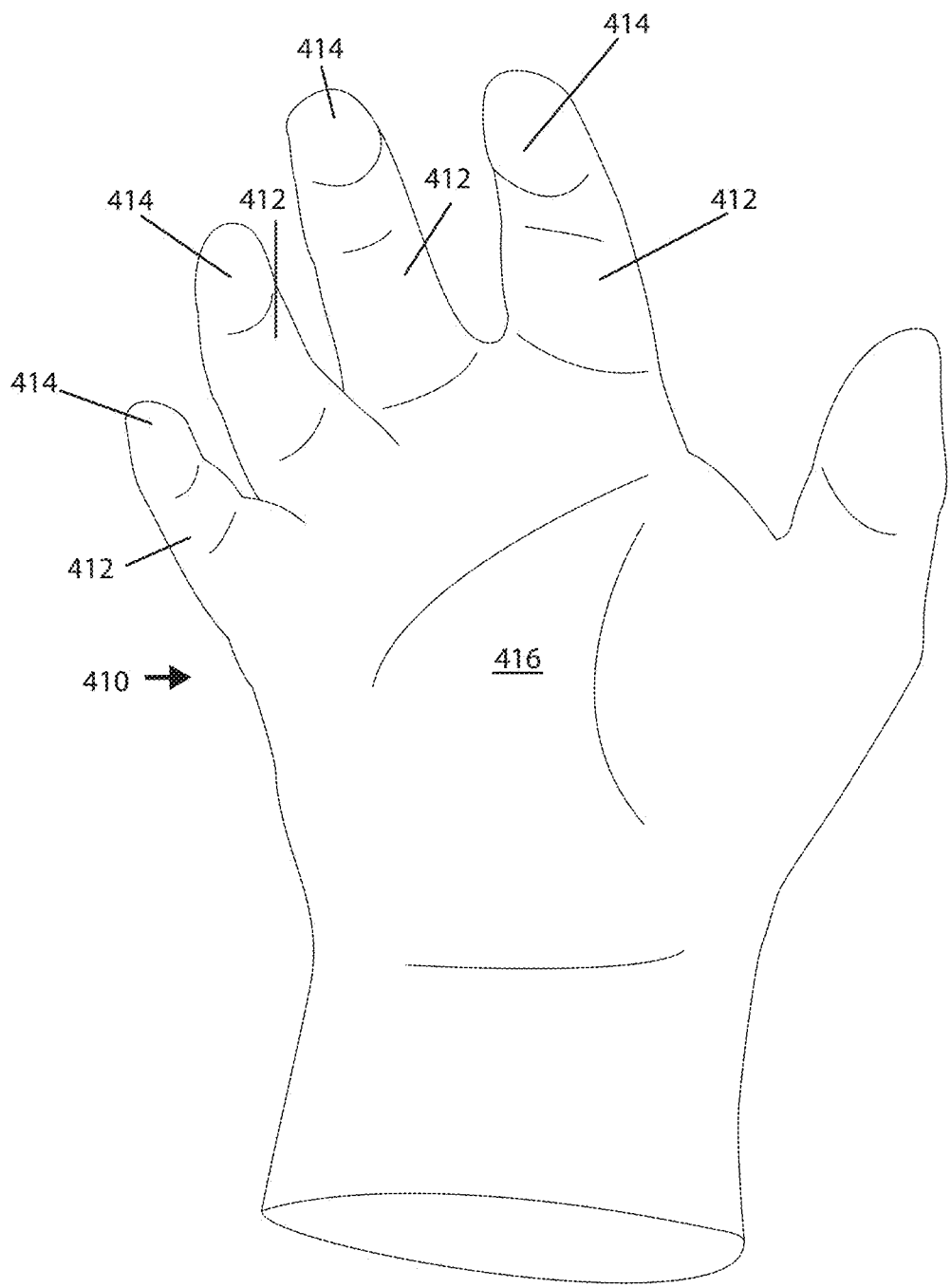
FIG. 25 is an illustration of a glove of the present disclosure.

FIG. 25 illustrates an optional device of the system, a glove 410. One or more fingers 412, fingertips 414, or other portions of the glove such as the palm 416 may be fitted with sensors to receive data on block type and position. Like the wand, the glove may comprise a processor for processing data and deciding on an action based on the data and a pre-programmed software stored in the processor and/or a contained memory unit or another connected, either wired or wirelessly processor and memory unit. The glove may comprise a signaling device for taking an action, wherein the action produced by the signaling device may be producing light, sound, or motion, in the form for instance of a vibration. Additionally, the glove may comprise a transmitter for conveying data to a separate processor and memory unit, as well as a power source. Material to fabricate the glove 410 may be insulating, to ensure non-conductance of electronic components to the hand, and non-allergenic.

Figure 26:
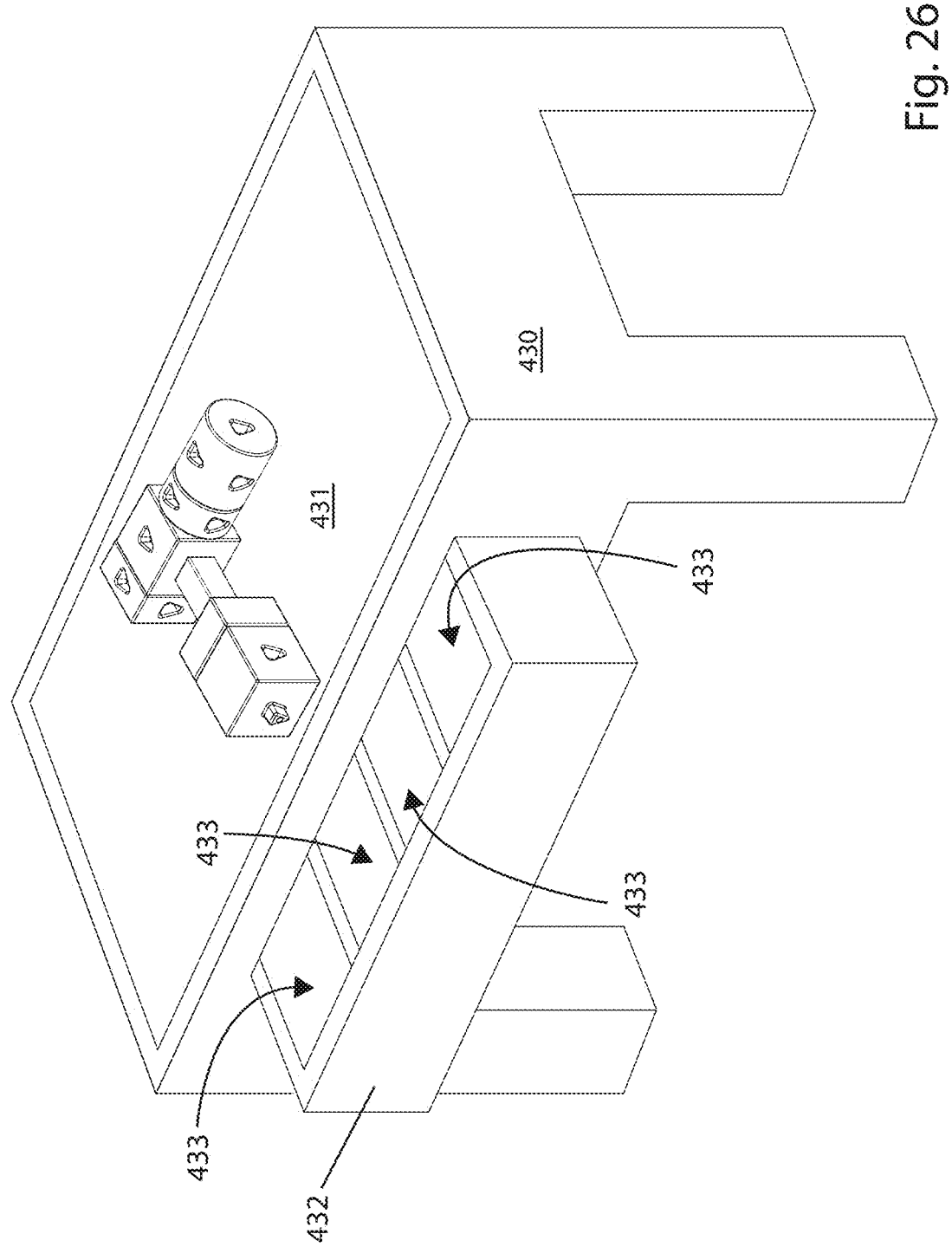
FIG. 26 is an illustration of a worktable of the present disclosure.

FIG. 26 illustrates an interactive or non-interactive worktable 430 that may be used to hold and stabilize blocks and models. The table may comprise a tabletop 431 with slots 12 and connectors 14 (not shown), designed to receive and connect to blocks of the system as well as open space, where the blocks may be placed for future use. The table may provide models of sentence structure to aid in arranging the blocks, such as on a display that may be a digital screen connected to a processor and or other components of the system. The table may hold the adjustable clamp and/or wand devices for use with the system such as in a drawer 432 and/or in bins 433. The drawer 432 or bins 433 may also store the blocks of the present disclosure. The tabletop 432 may be an electronic screen that interacts with the blocks, sending and receiving signals and data, processing data, and transmitting signals via either display, sound, or other means, to the blocks, the wand, and/or glove devices. Alternately a mobile device such as tablet or phone may be used to process and display, via sound, motion or visual cues, data about the system. The tabletop 432 may be comprised of connectors and/or slots for instance as few as one or more of each a connector and slot to couple with the blocks described herein. The tabletop 432 may have two or more, or three or more, or four or more, or five or more slots and/or connectors. These slots and/or connectors may be randomly positioned on the tabletop or in a pattern so as to position blocks beside each other, horizontally or vertically, to form sentence structures. Alternately blocks may be connected and stacked. Further the tabletop may comprise magnets or other additional connecting and/or locking means to secure blocks. In another form, the tabletop 432 may comprise magnets under the surface which attract magnets on the blocks such that the blocks may be paired with the magnets of the tabletop and used to manipulate and hold blocks of the system. The table and blocks of FIG. 26 provide a learner with a direct tactile experience for recognition of different parts of a sentence. For teaching purposes blocks may be connected and added to the tabletop that are intentionally a wrong arrangement of the blocks with respect to sentence structure to test understanding of the user and prompt the user to connect the blocks in the correct manner.

Figure 27:
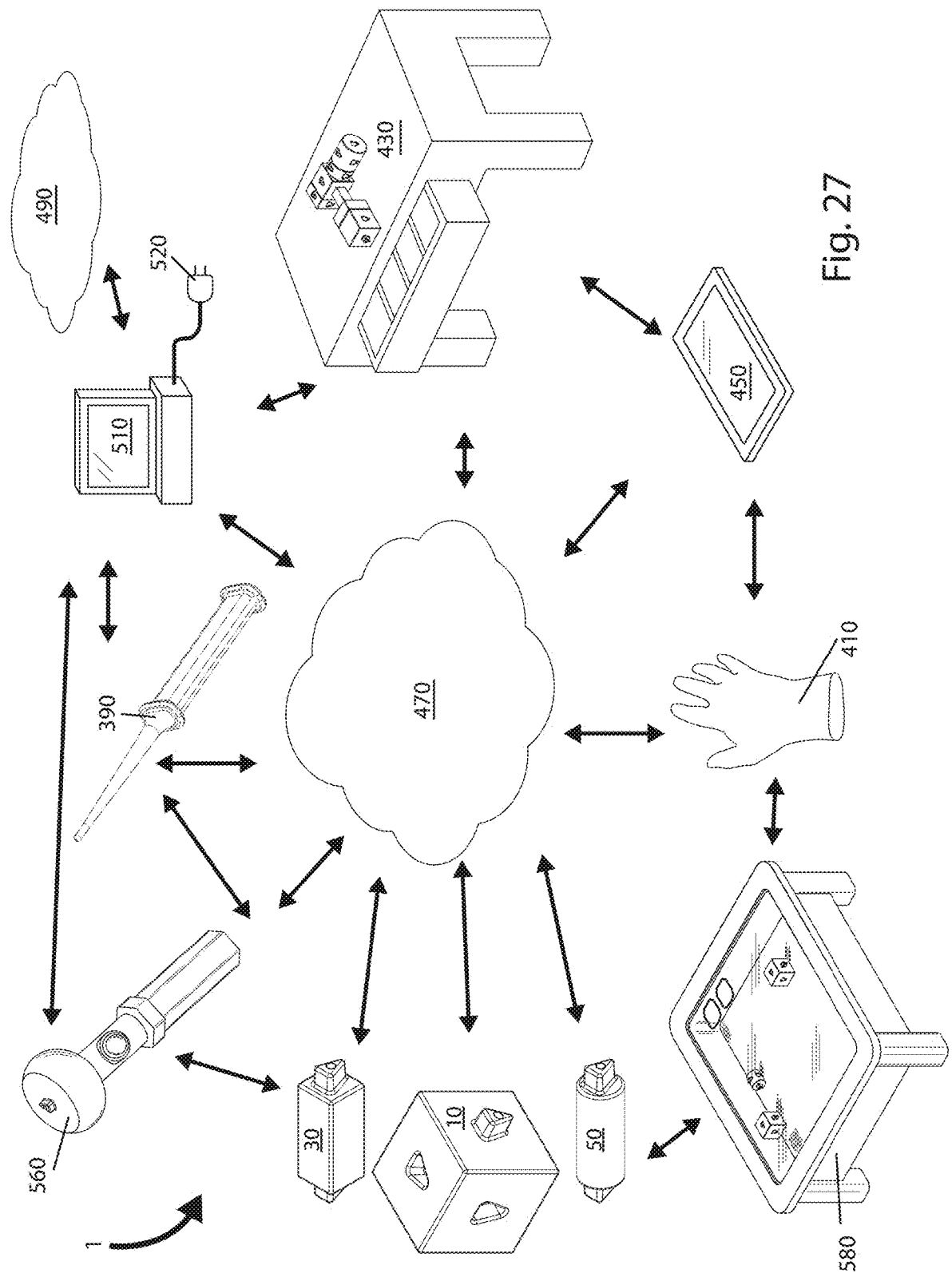
FIG. 27 is a schematic illustration of the system of the present disclosure.

As illustrated in FIG. 27, the learning system of the present disclosure 1 may comprise a set of blocks 2, including those described above, an interactive or non-interactive adjustable clamp 370, an interactive wand 390, an interactive glove 410, an interactive or non-interactive table 430, an interactive display such as a screen on a mobile device 450, an interactive form 560, or an electronic workstation 580, in addition to a connected network whether internet, Bluetooth 470, or other connection means, along with optionally a cloud-based processing and memory system 490, or other processing and memory system 510 along with power supply 520 to aid in learning of, for instance, parts of a sentence. One or more components shown in FIG. 27 may connect and work together to enhance and enrich learning for people including young, old, hearing impaired, and sight impaired, to promote learning of many types. Various software or plugins may be used with the system to enhance or further learning.

Figure 36:
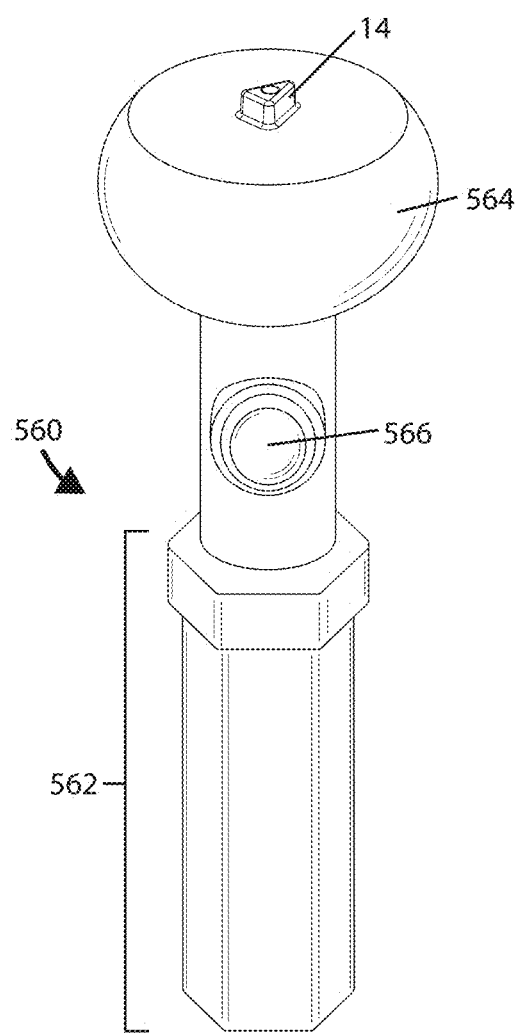
FIGS. 36-37 are illustrations of an example interactive form of the present disclosure.
Figure 37:
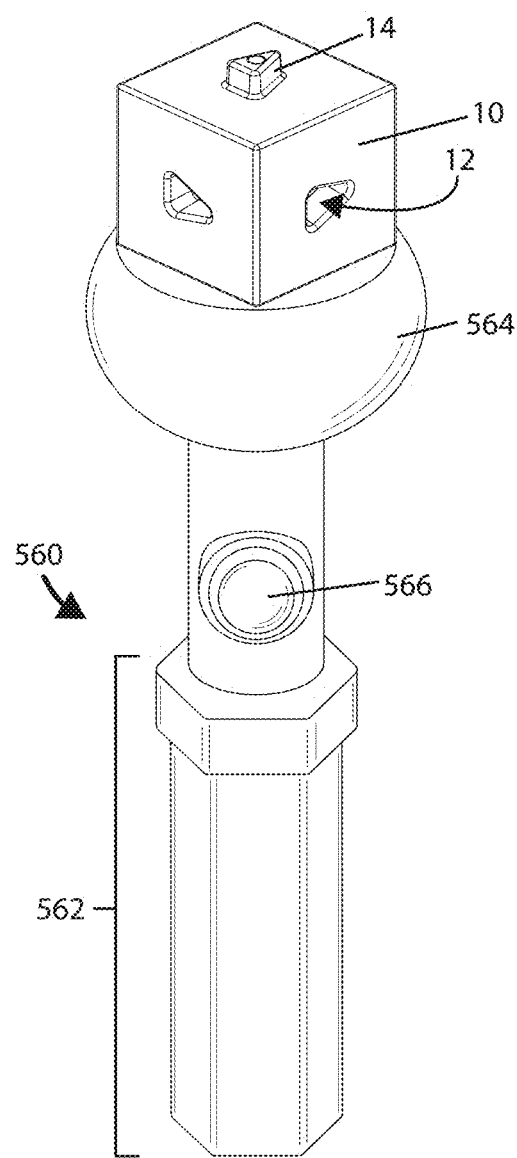

FIGS. 36-37 illustrate an interactive form 560 that may be part of the system described herein. This interactive form, shown here with handle 562 and base 564 make take any form whether cylindrical, hexagonal, rectangular, or any shape desired. Alternately, the interactive form 560 may take the shape of for instance a recognizable building, person, animal, or plant, actual or fictious, or a non-descript building, person, animal, plant, and/or a word or number. The handle 562 and/or base 564 comprises hardware such as a processor, memory, and communications means, wired or wireless, as well as a battery, or other means of power, whether wired or not, for carrying out interactive processes with the blocks of the system described herein and communicating either auditorily or visually with a user. Auditory or visual communication from the interactive form 560 may comprise reciting what part of the sentence the block 10, connected to the interactive form 560, as shown in FIG. 37, represents. Further auditory or visual communication may comprise giving examples of the part of the sentence for instance tree, boat, or dog, in the case of the noun block 10. Further communication may comprise asking a question and getting a response from the user. The interactive form may be a handheld device designed to fit a smaller child, or young adult sized hands. A grip, made of flexible, soft material, may be included that form fits at least one, or at least two fingers. The interactive form may be used for purposes of evaluation, improving learning performance, improving proficiency, and improving operating technology.

As shown in FIG. 36, a connector 14 sits on the base 564 for receiving a block. The connector 14 may alternately be replaced with a slot (not shown) in the base 564 to receive a connector of a block. The base 564 may not be essential in the design of the interactive form 550, being that the connector may be directly connected to the handle 562 with connector 14 protruding from the handle. An interactive button 566 may lie in the handle 562 or base 564, or in between, and be used for turning on and/or off the interactive form 560, prompting a response from the interactive form 560, or prompting inputting a response from the user.

Figure 38:
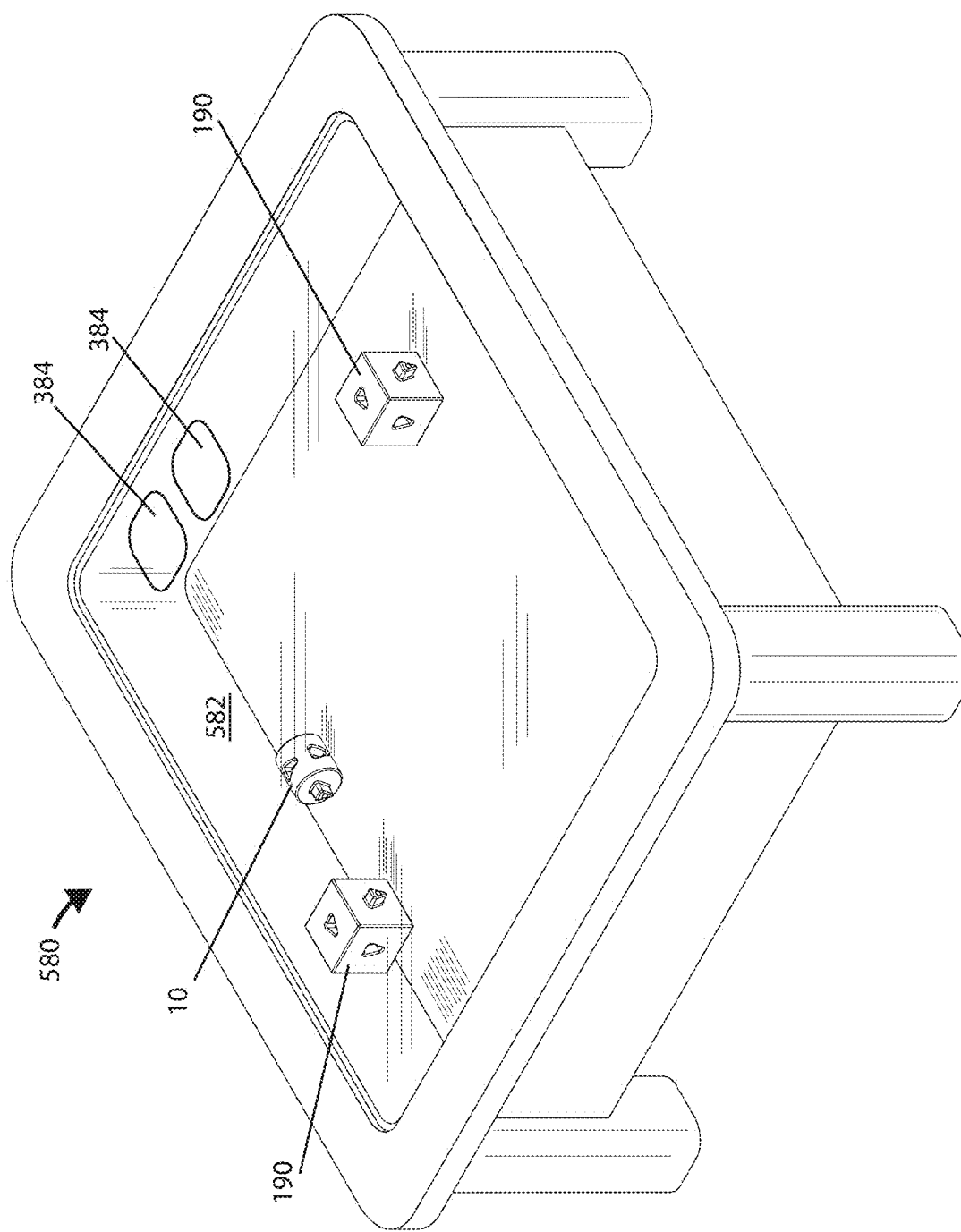
FIG. 38 is a perspective illustration of an electronic workstation table of the present disclosure.

FIG. 38 illustrates an example electronic workstation 580 of the present disclosure. As illustrated in FIG. 38 perspective of the workstation 580, the top surface display 582 comprises a touch enabled electronic display. The electronic workstation 580 further comprises a software program for learning grammatical sentence structure and parts of speech using the block system of the present disclosure. The software program may prompt a user to create a sentence with the various blocks putting together electronically for example a noun block 10 and verb block 190 using a drag and drop method when blocks are displayed on the screen with either physical touch, a mouse, stylus, or other instrument that interacts with the top surface display 582. The noun block 10 and verb block 190 are graphical images within the display 582 of the electronic workstation which may be produced by various means depending on display technology. After blocks are arranged by the student, the student may prompt the software to give feedback on their work. The program then rates their work on a wrong/right basis and/or makes suggestions for improvement prompting the student to retry the task if appropriate or presenting a new task. The student may access prior trials via opening files or images 384 of prior work performed, but not that of other past or current students unless granted access, saved in memory by the software program. In addition, a teacher may have access to files or images 384 of worked performed by a student or multiples students that are tagged with an identity to a certain student by the software program. The electronic workstation 580 of FIG. 38 may interact with other parts of the system. The electronic workstation 580 comprises components necessary to run the software program on the top surface display 582 either within the electronic workstation 580 or via receiving and transmitting electronic signal from a remote processor, controller, and/or memory system. It is envisioned that the electronic workstation 580 may also take the form of a handheld device or display form. The users display 582 may be duplicated on another device for viewing by the teacher or a wider audience such as a classroom either in person or remotely.

Students and teachers may create their unique user identification and password such that only students can access their own work or user information. Teachers may have access to student information or accounts and provide comments or evaluations as to student work. A student may edit their work until a deadline and then save a final product for review by a teacher. A student may provide and share complete or partial access to their account and/or work products to another student or support person for collaboration. The wand 390 and/or glove 410 of the present disclosure or other similar electronic device may be used to manipulate the blocks on the display 582.

EXAMPLES

Example 1

Figure 28:
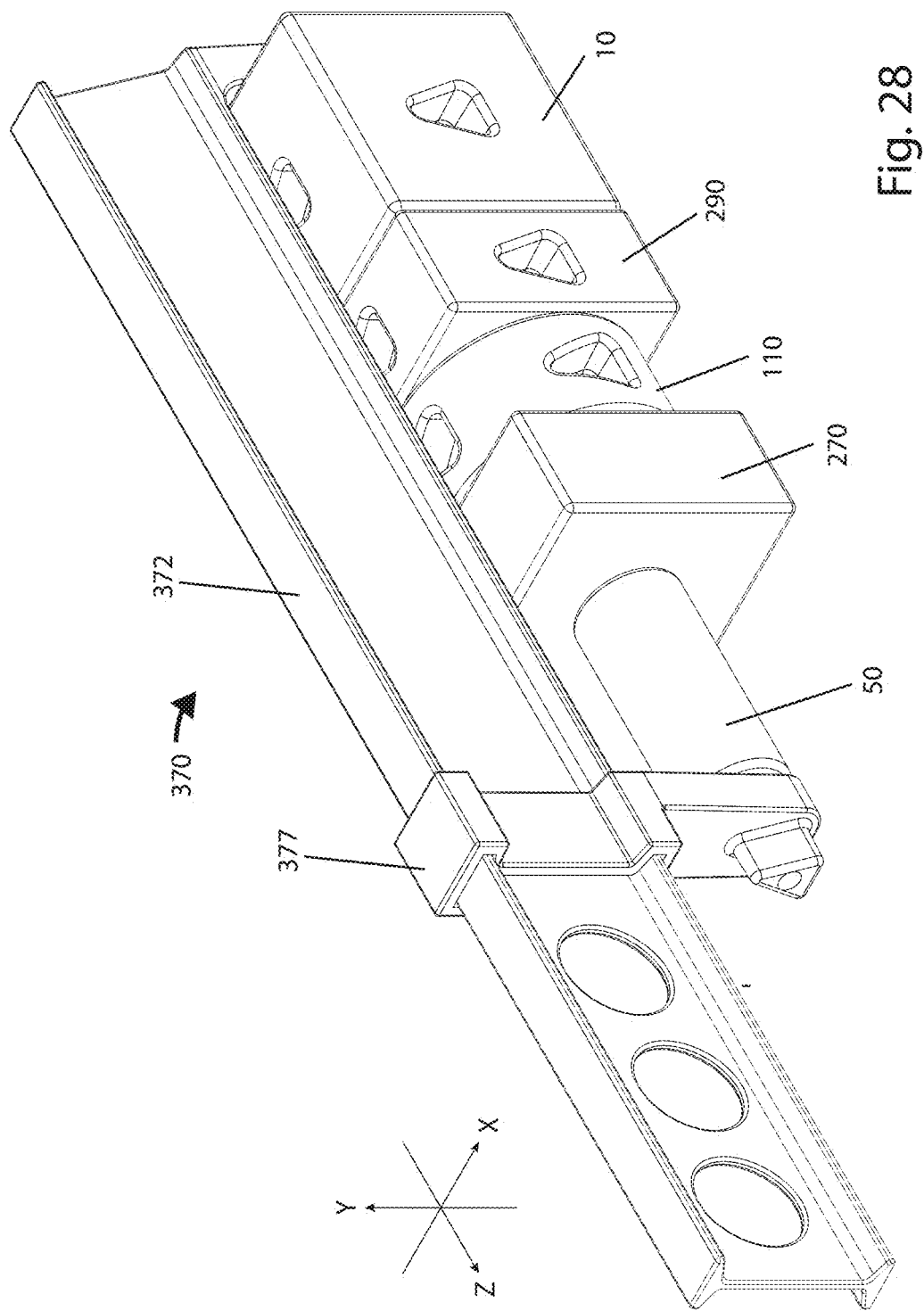
FIG. 28 is an illustration of blocks of the present disclosure arranged on the adjustable frame.

As illustrated in FIG. 28 select blocks of the disclosed system were arranged and fitted together in the adjustable frame 370, and secured with the reduction clamp 377, to show connection within a sentence. For example, as shown in FIG. 28, to form an adverbial prepositional phrase, an adverbial preposition 50 was fitted to an article 270, the article 270 to an adverb 110, the adverb 110 to an adjective 290, and the adjective 290 to a noun 10. An example adverbial prepositional phrase may be for example "under the sadly old man", wherein the adverbial preposition 50 is "under", "the" is an article 270, "sadly" is an adverb 110, "old" is an adjective 290, and "man" is a noun 10. The adverbial prepositional phrase "under the sadly old man" may be further connected into a sentence for example: "The coroner found a rattlesnake under the sadly old man who appeared to have died after being bitten," wherein additional blocks representing additional parts of the sentence are added to the adjustable frame 370. The referenced phrases or clauses may be part of a larger sentence: "The coroner found a rattlesnake under the sadly old man who appeared to have died after being bitten." By removing "sadly" from that group of words, the sentence could be more effective, for obviously "sadly" was a conclusion drawn by an observer, not necessarily the coroner, who could not have known the old man unless he was acquainted with that person before finding the body. If that old man was sad at the time of his death, he may have been suicidal, lost a friend, or had a terminal disease, but, if snake handling was a testimony to his cult beliefs, then the man was probably happy, even surprisingly happy when bit, for his sacrificial death would have confirmed his devotion as the way to overcome evil and set an example for other naive members of his cult. In addition, "old" might be removed from the text, for, under other unmentioned conditions, including when or where the body was found, the bite or heat could have exacerbated the aging factor. Then there is the comedic angle. The old man might have bought the snake with a money back guarantee stating, "This snake is friendly with people of all ages as long as he is fed one mouse every week on a Friday before ten am. The buyer must be vigilant. The other six days of the week are well known for the period when snakes are fasting." If there was an observer, then that person's words could provoke more creativity. A discussion of words in a frame and clamp ought to provoke a closer examination of word choice and a recommendation for fewer or additional words elsewhere in the composition.

The adjustable frame 370 may react with auditory or visual cues to blocks being connected or communicate with a handheld, mobile, or other device of the system or one fitted with software, an application, or plugin to interact with parts of the system, such that the blocks may be identified as connected to the adjustable frame 370.

Example 2

As a non-limiting example, blocks of the present disclosure may be color coded. A block or blocks representing a noun 10 for example may be colored blue. The block(s) for pronoun 150, 170 one of six colors including yellow for personal pronouns, brown for reflexive pronouns, black for demonstrative pronouns, white for interrogative pronouns, gray for indefinite pronouns, and orange for relative pronouns. The blocks for verbs may be colored either red, for intransitive and transitive verbs, or orange for linking verbs, adjective prepositions, coordinate conjunctions, prepositions, conjunctions, prepositions or conjunctions (dual-purpose object), correlative conjunctions, and adverbial prepositions or subordinate conjunctions (dual-purpose object), and adverbial conjunctions. The blocks may be arbitrarily color coded, color-coded based on another system, or each part of speech may be represented by a different color, in a non-limiting example. The verbal blocks may be colored blue for a gerund, green for a participle, and purple for an infinitive. Adjectives and articles may be colored green and adverbs purple. Adverbal conjunctions, prepositions, and conjunctions, being linking words, may be assigned to orange, and interjections may be assigned a pink color.

Example 3

Figure 29:
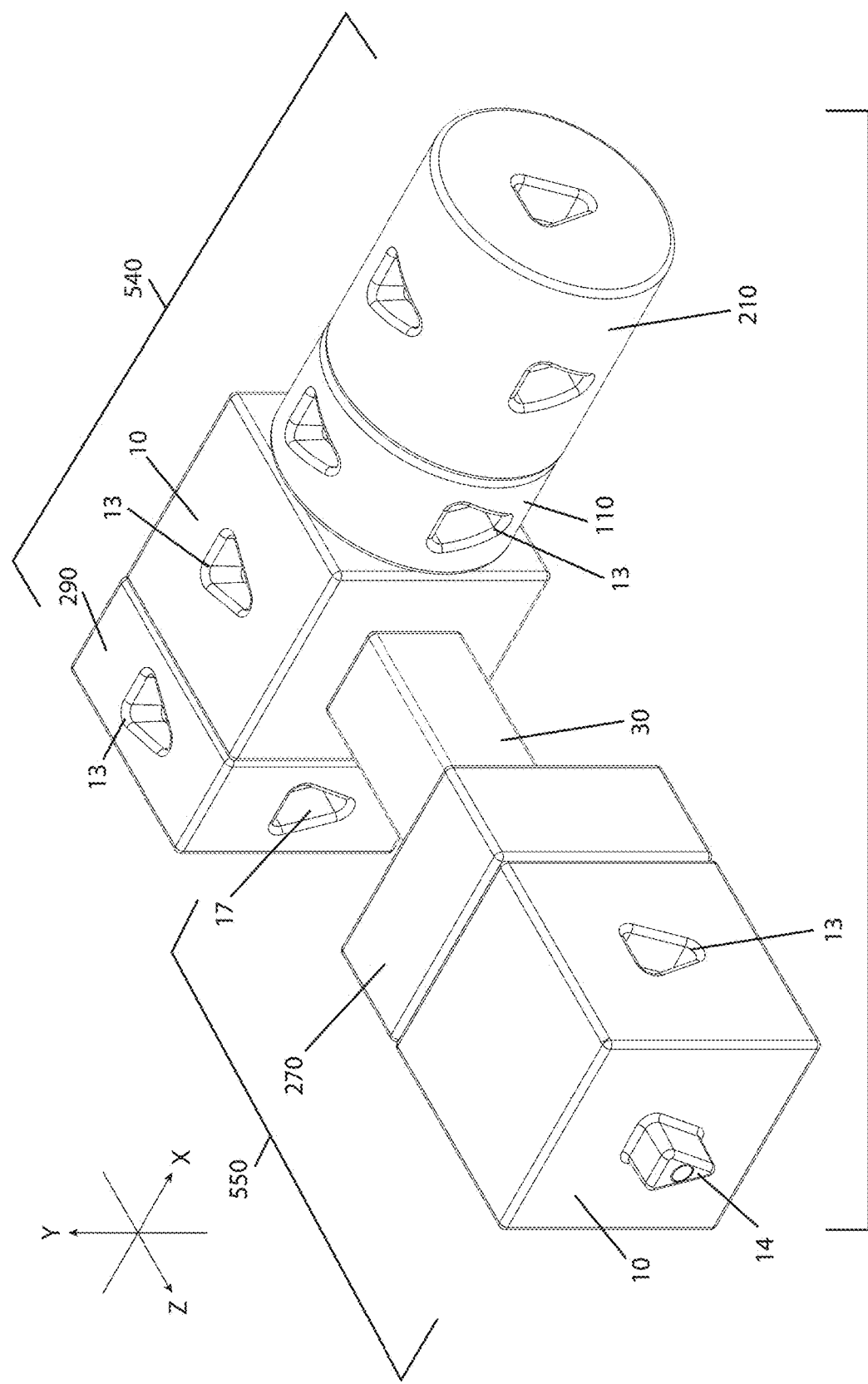
FIG. 29 is an illustration of an example arrangement of blocks of the present disclosure.
Figure 30:
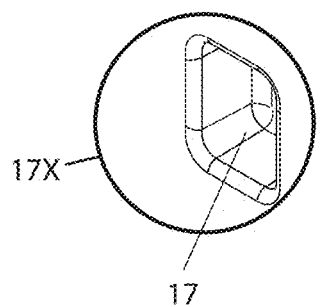
FIGS. 30-35 are illustrations of alternate shapes of the slots and connectors for blocks.
Figure 31:
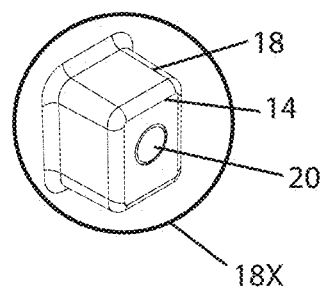
Figure 32:
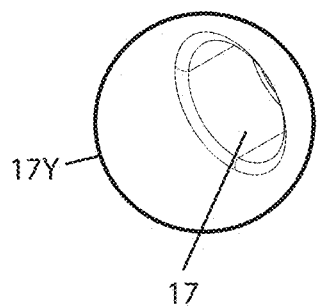
Figure 33:
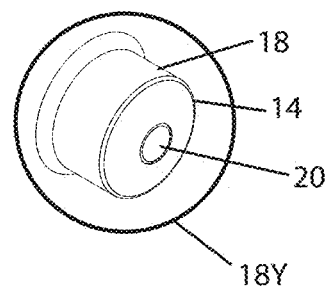
Figure 34:
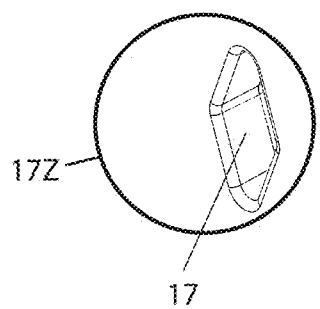
Figure 35:
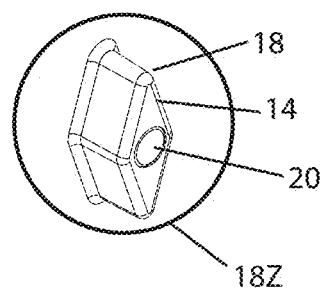

As illustrated in FIG. 29 select blocks of the present disclosure were fitted together to form a sentence to aid in learning sentence structure. In FIG. 29, a sentence structure 530 was formed from an independent clause 540 and a prepositional phrase 550. The sentence structure 540 may be, for example: "Scared birds quickly fly." In this example, "scared" is an adjective 290, "birds" is a noun 10, "quickly" is an adverb 110, and "fly" is an intransitive verb 210. The prepositional phrase 550 modifies the independent clause 540 forming the whole sentence 530. An example prepositional phrase may comprise, "with" as an adjective preposition 30, "the" as an article 270, and "noise" as a noun 10. The prepositional phrase 550 and the independent clause 540 fitted together forms the sentence: With the noise, scared birds quickly fly.

Although the present disclosure has been described with reference to the disclosed embodiments, numerous modifications and variations can be made and still the result will come within the scope of the disclosure. No limitation with respect to the specific embodiments disclosed herein is intended or should be inferred. Each apparatus embodiment described herein has numerous equivalents.

What is claimed is:

1. A set of blocks for teaching grammatical parts of a sentence, the set comprising:
   a) at least one hollow one-piece block of a first shape and a first size comprising at least one slot and at least one connector, wherein the first size comprises an x, a y, and a z direction, and wherein dimensions for the first size in each of the x, the y, and the z directions are equal;
   b) at least one hollow one-piece block of the first shape and a second size comprising at least one slot and at least one connector, wherein the second size is proportionally at least one-fifth smaller than the first size in the x, y, and z directions;

c) at least one hollow one-piece block of the first shape and a third size comprising at least five slots and at least one connector, wherein the third size is at least one-third smaller than the first size in the z direction;
d) at least one hollow one-piece block of the first shape and the third size consisting of one slot and one connector on opposing faces;
e) at least one hollow one-piece block of the first shape having a fourth size comprising one slot and one connector on opposing faces, wherein the fourth size is at least one-third smaller in the y direction than the first size;
f) at least one hollow one-piece block of a second shape consisting of one slot and one connector;
g) at least one hollow one-piece block of a third shape and the first size having at least one slot and at least one connector;
h) at least one hollow one-piece block of the third shape and the first size comprising one slot and one connector on opposing faces and a unique marker;
i) at least one hollow one-piece block of the third shape comprising one slot and one connector on opposing faces, having a size that is at least one-third smaller in the z direction compared to the first size;
j) at least one hollow one-piece block of the third shape having a size that is at least one-third smaller in the z direction compared to the first size and comprising at least five slots and at least one connector;
k) at least one hollow one-piece block of the third shape having a size that is one-quarter longer in the x direction and at least one-half smaller in the y direction compared with the first size and comprising one slot and one connector on opposing faces and a unique marker;
l) at least one hollow one-piece block of the third shape having a size in the x and z directions equaling that of the first size and a size in the y direction that is at least one-third smaller than that of the first size, having one slot and one connector on opposing faces, and further comprising a unique marker;
m) at least two hollow one-piece blocks of the third shape each having dimensions in the x and the z directions of the first size and a dimension in the y direction at least half that of the first size and comprising one slot and one connector on opposing faces of each;
n) at least one hollow one-piece block of the third shape having a size in the x and z directions equaling that of the first size, and a size in the y direction that is at least one-third smaller than that of the first size, comprising one slot and one connector on opposing faces;
o) at least one hollow one-piece block of the third shape having a size in the x direction and the y direction that is at least one-fifth that of the first size, and wherein the size of the at least one hollow one-piece block in the x direction equals the size of the at least one hollow one-piece block in the y plane, comprising at least one connector and at least one slot on opposing faces;
p) at least one hollow one-piece block of the third shape, comprising one slot and one connector on opposing faces positioned on integral protruding members;
q) wherein the connectors of each hollow one-piece block are designed to fit within the slots of any other of the other hollow one-piece blocks to temporarily connect the hollow one-piece blocks;
r) wherein each hollow one-piece block further comprises a power source and an electronic transmitter that can transmit, to a processor, a location and unique identifier pertaining to each of the hollow one-piece blocks;
s) wherein each of the hollow one-piece blocks further comprises a receiver; and
t) a prompting device that transmits and receives information about the location of each of the hollow one-piece blocks.

2. The set of claim 1, wherein the at least one hollow block of (b) consists of one connector and one slot on opposing faces.

3. The set of claim 1, wherein the at least one hollow block of (o) consists of one connector and one slot on opposing faces.

4. The set of claim 1, wherein the first shape, second shape, and third shape are different and each shape is selected from a cube, cuboid, triangular prism, and a cylinder.

5. The set of claim 1, wherein the first shape, second shape, and third shape differ and are selected from a cube, cuboid, triangular prism, cylinder, sphere, triangular cone, regular octahedron, sphere, triangular-based pyramid, and square-based pyramid.

6. The set of claim 1, wherein the connectors further comprise a magnet.

7. The set of claim 1, wherein the connectors protrude from the blocks.

8. The set of claim 7, wherein the connectors comprise a flat end and wherein edges between the flat end and protruding sides of the connector do not form a right angle.

9. The set of claim 8, wherein the edges between the flat end and the protruding sides comprises a convex shape.

10. The set of claim 8, wherein the edges between the flat end and the protruding sides comprise an angled shape.

11. The set of claim 10, wherein the edges between the flat end and the protruding sides comprises a beveled edge.

12. The set of claim 1, wherein at least one of the hollow one-piece blocks further comprises a visual cue.

13. The set of claim 12, wherein the visual cue is chosen from a number, letter, word, light, and an image.

14. The set of claim 1, wherein at least one of the hollow one-piece blocks further comprises a tactile cue.

15. The set of claim 14, wherein the tactile cue is Braille.

16. The set of claim 1, wherein at least one of the hollow one-piece blocks further comprises a means to produce an auditory cue.

17. The set of claim 1, wherein:
a) each of the at least one hollow blocks of the first shape are a first same color;
b) each of the at least one hollow blocks of the second shape are a second same color;
c) each of the at least one hollow blocks of the third shape are a third same color; and
d) each of the first same color, second same color, and third same color is a unique color.

18. The set of claim 1, wherein two of the first shape, second shape, and third shape are the same color.

19. The set of claim 1 further comprising an imaging system for visualizing locations of the blocks.

20. The set of claim 1 further comprising an auditory system for producing a sound.

21. The set of claim 1, wherein the prompting device is a pointing device.

22. The set of claim 1, wherein the prompting device is a wand.

23. The set of claim 1 further comprising a glove capable of receiving information about identity of a block and producing a response to the block.

24. The set of claim 1 further comprising an adjustable frame to hold one or more of the hollow one-piece blocks.

25. The set of claim 24, wherein the adjustable frame comprises a transmitter and a power means to transmit a location and a designation for each block on the frame to a processor.

26. The set of claim 1 further comprising a worktable capable of pairing with at least one of the hollow one-piece blocks.

27. The set of claim 26, wherein at least one of the hollow one-piece blocks further comprises a power source and an electronic transmitter to transmit a location to the worktable.

28. The set of claim 26, wherein the worktable comprises a power source, a receiver, and a processor.

29. The set of claim 28 further comprising an imaging system with an image display on a surface of the worktable.

30. The set of claim 29, wherein the worktable further comprises a sound system that produces sound information as to the locations of the hollow one-piece blocks.

31. The set of claim 1 further comprising an interactive form, wherein the interactive form can temporarily connect to at least one of the hollow one-piece blocks.

32. The set of claim 31, wherein the interactive form is capable of recognizing at least one of the hollow one-piece blocks and producing an auditory or visual cue pertaining to the at least one of the hollow one-piece blocks.

33. The set of claim 1, wherein the hollow one-piece blocks are formed from a child-safe plastic.

34. The set of claim 33, wherein the child-safe plastic is selected from polyethylene, polyvinyl chloride, polypropylene, and acrylonitrile butadiene styrene.

35. The set of claim 1, wherein the edges of the hollow one-piece blocks are beveled, angled, or convex edges.

36. The set of claim 1, wherein:
a) the at least one hollow one-piece block of a) of claim 1 represents a noun;
b) the at least one hollow one-piece block of b) of claim 1 represents a pronoun;
c) the at least one hollow one-piece block of c) of claim 1 represents an adjective;
d) the at least one hollow one-piece block of d) of claim 1 represents an article;
e) the at least one hollow one-piece block of e) of claim 1 represents an adjective preposition;
f) the at least one hollow one-piece block of f) of claim 1 represents an interjection;
g) the at least one hollow one-piece block of g) of claim 1 represents an intransitive or transitive verb;
h) the at least one hollow one-piece block of h) of claim 1 represents a linking verb;
i) the at least one hollow one-piece block of i) of claim 1 represents a helping verb;
j) the at least one hollow one-piece block of j) of claim 1 represents an adverb;
k) the at least one hollow one-piece block of k) of claim 1 represents a coordinate conjunction;
l) The at least one hollow one-piece block of l) of claim 1 represents an alternate preposition or conjunction;
m) the at least two hollow one-piece blocks of m) of claim 1 represent a correlative conjunction;
n) the at least one hollow one-piece block of n) of claim 1 represents an adverbial preposition or subordinate conjunction;
o) The at least one hollow one-piece block of o) of claim 1 represents a verbal; and
p) the at least one hollow one-piece block of p) of claim 1 represents an adverbial conjunction.

\* \* \* \* \*